(12) United States Patent
Hamrick et al.

(10) Patent No.: US 8,010,251 B2
(45) Date of Patent: *Aug. 30, 2011

(54) G.P.S. MANAGEMENT SYSTEM

(75) Inventors: Marvin R. Hamrick, Watkinsville, GA (US); R. T. Mitchell Ingman, Peachtree City, GA (US)

(73) Assignee: AT&T Intellectutal Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/757,093

(22) Filed: Apr. 9, 2010

(65) Prior Publication Data

US 2010/0198460 A1    Aug. 5, 2010

Related U.S. Application Data

(63) Continuation of application No. 11/318,112, filed on Dec. 23, 2005, now Pat. No. 7,725,218, which is a continuation of application No. 10/006,655, filed on Dec. 10, 2001, now Pat. No. 7,272,493, which is a continuation of application No. 09/474,368, filed on Dec. 29, 1999, now Pat. No. 6,356,841.

(51) Int. Cl.
*G06F 19/00* (2006.01)

(52) U.S. Cl. ........ 701/36; 701/29; 340/426.25; 340/428

(58) Field of Classification Search .............. 701/36, 701/29; 340/426, 990, 995, 825.34, 825.36, 340/825.49, 426.25, 428; 342/386, 457; G06F 19/00; B62D 21/00

See application file for complete search history.

(56) References Cited

U.S. PATENT DOCUMENTS

| | | | | |
|---|---|---|---|---|
| 4,055,772 A | * | 10/1977 | Leung | 307/10.1 |
| 5,438,517 A | * | 8/1995 | Sennott et al. | 701/213 |
| 5,548,822 A | * | 8/1996 | Yogo | 455/68 |
| 5,557,254 A | * | 9/1996 | Johnson et al. | 340/426.19 |
| 5,673,017 A | * | 9/1997 | Dery et al. | 340/426.17 |
| 5,719,551 A | * | 2/1998 | Flick | 340/426.25 |
| 5,821,631 A | * | 10/1998 | Loraas et al. | 340/5.3 |
| 5,968,107 A | * | 10/1999 | Vogan et al. | 701/102 |
| 5,986,543 A | * | 11/1999 | Johnson | 340/426.19 |
| 6,026,345 A | * | 2/2000 | Shah et al. | 701/117 |
| 6,028,505 A | * | 2/2000 | Drori | 340/426.17 |
| 6,337,621 B1 | * | 1/2002 | Ogino et al. | 340/425.5 |
| 6,339,745 B1 | * | 1/2002 | Novik | 701/208 |
| 6,493,557 B1 | * | 12/2002 | Yoshida | 455/456.3 |
| 6,664,899 B1 | * | 12/2003 | Tsuchihashi | 340/825.69 |

OTHER PUBLICATIONS

Gloyer, B.; Aghajan, H.K.; Kai-Yeung Siu; Kailath, T.; "Vehicle detection and tracking for freeway traffic monitoring"; Signals, Systems and Computers, 1994. 1994 Conference Record of the Twenty-Eighth Asilomar Conference on vol. 2; Digital Object Identifier: 10.1109/ACSSC.1994.471604; Publication Year: 1994, pp. 970-974 vol. 2.*

Howlett, R.J; "Condition monitoring and fault diagnosis in a domestic car engine using a neural network"; Artificial Intelligence in Consumer and Domestic Products (Digest No. 1996/212), IEE Colloquium on; Digital Object Identifier: 10.1049/ic:19961142; Publication Year: 1996, pp. 5/1-5/4.*

* cited by examiner

*Primary Examiner* — Tuan C To

(74) *Attorney, Agent, or Firm* — Parks IP Law LLC; Mickki D. Murray, Esq.

(57) ABSTRACT

A management system using Global Positioning System receivers for tracking remote units from a central office and quickly and conveniently determining if those remote units have varied from a set of predetermined parameters of operation. The system also includes provisions that allows information to be sent from the remote units to the central office and vice versa. The system also has safety features that promote the rapid dispatch of law enforcement personnel when requests for emergency assistance have been made from the remote units.

10 Claims, 20 Drawing Sheets

Weekly Division Report — 802  800  804  1/25/98 through 1/31/98

Division: North Atlanta  Manager Name: Manny Gerr

Service Center: 14th Street  Supervisor: Sue Purvizer  808  810

| Date | Average Out of Gate | Average Back to Barn | Avg. Work Time | Average Windshield Time | Average Engine Run Time | Average Engine Starts | Average Revisits | Average Mileage |
|---|---|---|---|---|---|---|---|---|
| 1/25/98 | | | | | | | | |
| 1/26/98 | 8:12 A | 4:31 P | 7:19 | 1:53 | 2:02 | 5.3 | 1.5 | 61.9 |
| 1/27/98 | 8:17 A | 4:19 P | 7:02 | 2:12 | 2:23 | 8.1 | 2.1 | 65.7 |
| 1/28/98 | 8:29 A | 4:55 P | 7:26 | 1:47 | 1:59 | 7.3 | 1.9 | 59.2 |
| 1/29/98 | 8:01 A | 5:15 P | 8:14 | 1:44 | 1:57 | 7.9 | 1.8 | 60.3 |
| 1/30/98 | 8:13 A | 5:01 P | 7:48 | 1:22 | 1:40 | 6.9 | 2.2 | 67.2 |
| 1/31/98 | | | | | | | | |
| Weekly Avg: | 8:14 | 4:48 | 7:34 | 1:30 | 1:42 | 6.4 | 1.4 | 52.8 |

820

Service Center: Fairburn  Supervisor: George P. Burdell

| Date | Average Out of Gate | Average Back to Barn | Avg. Work Time | Average Windshield Time | Average Engine Run Time | Average Engine Starts | Average Revisits | Average Mileage |
|---|---|---|---|---|---|---|---|---|
| 1/26/98 | 8:12 A | 4:31 P | 7:19 | 1:53 | 2:02 | 7.7 | 2.2 | 58.8 |
| 1/27/98 | 8:17 A | 4:19 P | 7:02 | 2:12 | 2:23 | 8.0 | 2.3 | 59.2 |
| 1/28/98 | 8:29 A | 4:55 P | 7:26 | 1:47 | 1:59 | 8.2 | 1.9 | 57.2 |
| 1/29/98 | 8:01 A | 5:15 P | 8:14 | 1:44 | 1:27 | 7.6 | 1.9 | 56.9 |
| 1/30/98 | 8:13 A | 5:01 P | 7:48 | 1:22 | 1:40 | 7.9 | 1.8 | 55.5 |
| 1/31/98 | | | | | | | | |
| Weekly Avg: | 8:14 | 4:48 | 7:34 | 1:30 | 1:42 | 6.4 | 1.4 | 52.8 |

Service Center: Stockbridge  Supervisor: Ralph Puchs

| Date | Average Out of Gate | Average Back to Barn | Avg. Work Time | Average Windshield Time | Average Engine Run Time | Average Engine Starts | Average Revisits | Average Mileage |
|---|---|---|---|---|---|---|---|---|
| 1/26/98 | 8:12 A | 4:31 P | 7:19 | 1:53 | 2:02 | 9.1 | 3.0 | 79.9 |
| 1/27/98 | 8:17 A | 4:19 P | 7:02 | 2:12 | 2:23 | 10.5 | 2.8 | 81.2 |
| 1/28/98 | 8:29 A | 4:55 P | 7:26 | :47 | :59 | 10.4 | 2.7 | 83.2 |
| 1/29/98 | 8:01 A | 5:15 P | 8:14 | 1:44 | 1:27 | 10.1 | 2.8 | 84.5 |
| 1/30/98 | 8:13 A | 5:01 P | 7:48 | 1:22 | 1:40 | 9.8 | 3.0 | 78.1 |
| 1/31/98 | | | | | | | | |
| Weekly Avg: | 8:14 | 4:48 | 7:34 | 1:30 | 1:42 | 6.4 | 1.4 | 52.8 |

840

Service Center: Tucker  Supervisor: Anita Goodtek

| Date | Average Out of Gate | Average Back to Barn | Avg. Work Time | Average Windshield Time | Average Engine Run Time | Average Engine Starts | Average Revisits | Average Mileage |
|---|---|---|---|---|---|---|---|---|
| 1/26/98 | 8:12 A | 4:31 P | 7:19 | 1:53 | 2:02 | 5 | 1 | 61 |
| 1/27/98 | 8:17 A | 4:19 P | 7:02 | 2:12 | 2:23 | 8 | 2 | 97 |
| 1/28/98 | 8:29 A | 4:55 P | 7:26 | :47 | :59 | 4 | 0 | 23 |
| 1/29/98 | 8:01 A | 5:15 P | 8:14 | 1:14 | 1:27 | 6 | 1 | 42 |
| 1/30/98 | 8:13 A | 5:01 P | 7:48 | 1:22 | 1:40 | 9 | 3 | 41 |
| 1/31/98 | | | | | | | | |
| Weekly Avg: | 8:14 | 4:48 | 7:34 | 1:30 | 1:42 | 6.4 | 1.4 | 52.8 |
| Weekly Avg: | 8:13 | 4:46 | 7:33 | 1:32 | 1:39 | 5.1 | 1.8 | 49.7 |

FIG.9

BellSouth GPS System — 1002  
Supervisor Page — 1004

1000

Name: Sue Purviser — 1006, 1008
Service Center: 14th Street

6 February, 1998 — 1010

Auto-Generated Reports: — 1010

| Group | Technician | Vehicle | Report | Date | Exc |
|-------|-----------|---------|--------|------|-----|
| G14S | ST109 | V00702 | Daily Route History | 2/5/98 | |
| G14S | ST143 | V01444 | Daily Route History | 2/5/98 | |
| G14S | ST152 | V93453 | Daily Route History | 2/5/98 | Spd |
| G99T | ST177 | V39543 | Daily Route History | 2/5/98 | |
| G99T | ST183 | V47303 | Daily Route History | 2/5/98 | |
| G99T | ST217 | V11406 | Daily Route History | 2/5/98 | |
| G99T | ST218 | V56843 | Daily Route History | 2/5/98 | |
| G99T | ST219 | V00044 | Daily Route History | 2/5/98 | |
| G99T | ST291 | V98573 | Daily Route History | 2/5/98 | |
| 14th St | | | Weekly Statistics | 1/31/98 | |
| 14th St | | | Weekly Statistics | 1/24/98 | |
| 14th St | | | Weekly Statistics | 1/17/98 | |
| 14th St | | | Weekly Statistics | 1/10/98 | |
| 14th St | | | Weekly Statistics | 1/3/98 | |
| 14th St | | | Weekly Statistics | 12/27/97 | |
| 14th St | | | Weekly Statistics | 12/20/97 | |
| 14th St | | | Weekly Statistics | 12/13/97 | |
| 14th St | | | Monthly Statistics | 12/97 | |
| 14th St | | | Monthly Statistics | 1/98 | |

Options: — 1014

1022 — Locate Vehicle | Vehicle ID: V93453

1024 — Technician Attributes | Technician ID: Lou Ledfoot

1026 — Vehicle Attributes | Vehicle ID: V93453

1028 — Generate Daily Route History | Generate Productivity Parameters — 1030

FIG. 10

Weekly Statistics 1/25/98 through 1/31/98

Service Center: 14th Street  Supervisor Name: Sue Purvizer

Group: G14S    Vehicle: V00702   Technician: ST109

| Date | Out of Gate | Back to Barn | Work Time | Windshield Time | Engine Run Time | Engine Starts | Revisits | Mileage |
|---|---|---|---|---|---|---|---|---|
| 1/25/98 | | | | | | | | |
| 1/26/98 | 8:12 A | 4:31 P | 7:19 | 1:53 | 2:02 | 5 | 1 | 61 |
| 1/27/98 | 8:17 A | 4:19 P | 7:02 | 2:12 | 2:23 | 8 | 2 | 97 |
| 1/28/98 | 8:29 A | 4:55 P | 7:26 | :47 | :59 | 4 | 0 | 23 |
| 1/29/98 | 8:01 A | 5:15 P | 8:14 | 1:14 | 1:27 | 6 | 1 | 42 |
| 1/30/98 | 8:13 A | 5:01 P | 7:48 | 1:22 | 1:40 | 9 | 3 | 41 |
| 1/31/98 | | | | | | | | |
| Avg: | 8:14 | 4:48 | 7:34 | 1:30 | 1:42 | 6.4 | 1.4 | 52.8 |

Group: G14S    Vehicle: V01444   Technician: ST143

| Date | Out of Gate | Back to Barn | Work Time | Windshield Time | Engine Run Time | Engine Starts | Revisits | Mileage |
|---|---|---|---|---|---|---|---|---|
| 1/25/98 | | | | | | | | |
| 1/26/98 | 8:11 A | 4:30 P | 7:19 | 1:53 | 2:02 | 5 | 1 | 61 |
| 1/27/98 | 8:18 A | 4:20 P | 7:02 | 2:12 | 2:23 | 8 | 2 | 97 |
| 1/28/98 | 8:28 A | 4:54 P | 7:26 | :47 | :59 | 4 | 0 | 23 |
| 1/29/98 | 8:02 A | 5:16 P | 8:14 | 1:14 | 1:27 | 6 | 1 | 42 |
| 1/30/98 | 8:15 A | 5:03 P | 7:48 | 1:22 | 1:40 | 9 | 3 | 41 |
| 1/31/98 | | | | | | | | |
| Avg: | 8:14 | 4:48 | 7:34 | 1:30 | 1:42 | 6.4 | 1.4 | 52.8 |

FIG. 11

| Group: G14S | | Vehicle: | V93453 | Technician: | ST152 | | | 1130 |
|---|---|---|---|---|---|---|---|---|
| Date | Out of Gate | Back to Barn | Work Time | Windshield Time | Engine Run Time | Engine Starts | Revisits | Mileage |
| 1/25/98 | | | | | | | | |
| 1/26/98 | 8:07 A | 4:26 P | 7:19 | 1:53 | 2:02 | 5 | 1 | 61 |
| 1/27/98 | 8:12 A | 4:14 P | 7:02 | 2:12 | 2:23 | 8 | 2 | 97 |
| 1/28/98 | 8:24 A | 4:50 P | 7:26 | :47 | :59 | 4 | 0 | 23 |
| 1/29/98 | 8:06 A | 5:20 P | 8:14 | 1:14 | 1:27 | 6 | 1 | 42 |
| 1/30/98 | 8:08 A | 5:06 P | 7:58 | 1:22 | 1:40 | 9 | 3 | 41 |
| 1/31/98 | | | | | | | | |
| Avg: | 8:11 | 4:47 | 7:34 | 1:30 | 1:42 | 6.4 | 1.4 | 52.8 |
| Group Avg: | 8.22 | 4:47 | 7:25 | 1:57 | 2:03 | 7.1 | 1.5 | 62.9 |
| Division Avg: | 8:23 | 4:49 | 7:26 | 1:48 | 1:59 | 7.2 | 1.6 | 57.0 |

FIG.12

1302 — Daily Route History  1300
1304
1306  1310
1312 — Name: Lou Ledfoot
Technician ID: ST 152
Vehicle ID: V93453  1314 — Group: G14S
Date: 2/5/98  Service Center: 14th Street
1308

1320

| # | Time | Street Address | County/State | Minutes | Speed | Point Type |
|---|------|----------------|--------------|---------|-------|------------|
| 1 | 08:17 | 345 14th Street | Fulton GA | | 0.0 | Engine Start |
| 2 | 08:22 | | | | 5.1 | Out of Gate |
| 3 | 08:27 | | | | 35.7 | |
| 4 | 08:31 | | | | 42.1 | |
| 5 | 08:34 | | | | 44.9 | |
| 6 | 08:37 | 77 10th Street | Fulton GA | | 0.0 | Engine Stop |
| 7 | 08:37 | 77 10th Street | Fulton GA | 87 | 0.0 | Extended Stop |
| 8 | 10:04 | 77 10th Street | Fulton GA | | 0.0 | Engine Start |
| 9 | 10:06 | | | | 17.1 | |
| 10 | 10:11 | | | | 32.7 | |
| 11 | 10:16 | | | | 47.9 | |
| 12 | 10:21 | | | | 39.9 | |
| 13 | 10:25 | 345 14th Street | Fulton GA | 12 | 0.0 | Revisit |
| 14 | 10:25 | 345 14th Street | Fulton GA | | 0.0 | Engine Stop |
| 15 | 10:37 | 345 14th Street | Fulton GA | | 0.0 | Engine Start |
| 16 | 10:42 | | | | 32.1 | |
| 17 | 10:47 | | | | 44.7 | |
| 18 | 10:52 | | | | 49.4 | |
| 19 | 10:57 | | | | 55.7 | |
| 20 | 10:58 | | | | 75.2 | Excessive Speed |
| 21 | 11:02 | | | | 31.1 | |
| 22 | 11:03 | 357 Peachtree Pl | Fulton GA | | 0.0 | Engine Stop |
| 23 | 11:03 | 357 Peachtree Pl | Fulton GA | 281 | 0.0 | Extended Stop |
| 24 | 3:20 | 357 Peachtree Pl | Fulton GA | | 0.0 | Low Battery |
| 25 | 3:44 | 357 Peachtree Pl | Fulton GA | | 0.0 | Engine Start |
| 26 | 3:49 | | | | 5.2 | |
| 27 | 4:04 | | | | 37.7 | |
| 28 | 4:09 | | | | 44.3 | |
| 29 | 4:14 | | | | 41.9 | |
| 30 | 4:16 | 345 14thStreet | Fulton GA | | 0.0 | Back to Barn |
| 31 | 4:17 | 345 14thStreet | Fulton GA | | 0.0 | Engine Stop |

1330

Time Out of Gate:   08:22 AM      Engine Run Time:  1:40
Time Back to Barn:  4:17 PM       Mileage:          27.3
Windshield Time:    1:34          # of Starts:      4

FIG.13

| Id | Vehicle Name | Date | Time | Typ | Minutes | Speed | Address | County | State | Zip |
|---|---|---|---|---|---|---|---|---|---|---|
| 1 | SB923_02972 | 09/13/97 | 00:01:29 | HI | 0 | 0 | | | | |
| 2 | SB923_02972 | 09/13/97 | 00:51:30 | ST | 85 | 0 | OLD HUDSON BRIDGE RD | HENRY | GA | 3028 |
| 3 | SB923_02972 | 09/13/97 | 01:36:30 | HI | 0 | 0 | | | | |
| 4 | SB923_02972 | 09/13/97 | 05:16:40 | ST | 442 | 0 | OLD HUDSON BRIDGE RD | HENRY | GA | 3028 |
| 5 | SB923_02972 | 09/13/97 | 08:58:44 | HI | 0 | 42 | | | | |
| 6 | SB923_02972 | 09/13/97 | 08:59:22 | HI | 0 | 45 | | | | |
| 7 | SB923_02972 | 09/13/97 | 09:00:34 | HI | 0 | 54 | | | | |
| 8 | SB923_02972 | 09/13/97 | 09:01:13 | HI | 0 | 37 | | | | |
| 9 | SB923_02972 | 09/13/97 | 09:01:45 | HI | 0 | 44 | | | | |
| 10 | SB923_02972 | 09/13/97 | 09:02:50 | HI | 0 | 45 | | | | |
| 11 | SB923_02972 | 09/13/97 | 09:03:31 | HI | 0 | 45 | | | | |
| 12 | SB923_02972 | 09/13/97 | 09:04:08 | HI | 0 | 52 | | | | |
| 13 | SB923_02972 | 09/13/97 | 09:04:42 | HI | 0 | 49 | | | | |
| 14 | SB923_02972 | 09/13/97 | 09:05:20 | HI | 0 | 50 | | | | |
| 15 | SB923_02972 | 09/13/97 | 09:05:56 | HI | 0 | 52 | | | | |
| 16 | SB923_02972 | 09/13/97 | 09:06:30 | HI | 0 | 55 | | | | |
| 17 | SB923_02972 | 09/13/97 | 09:07:09 | HI | 0 | 52 | | | | |
| 18 | SB923_02972 | 09/13/97 | 09:07:43 | HI | 0 | 52 | | | | |
| 19 | SB923_02972 | 09/13/97 | 09:08:42 | HI | 0 | 48 | | | | |
| 20 | SB923_02972 | 09/13/97 | 09:09:21 | HI | 0 | 51 | | | | |
| 21 | SB923_02972 | 09/13/97 | 09:10:00 | HI | 0 | 51 | | | | |
| 22 | SB923_02972 | 09/13/97 | 09:10:55 | HI | 0 | 16 | | | | |
| 23 | SB923_02972 | 09/13/97 | 09:20:04 | HI | 0 | 48 | | | | |
| 24 | SB923_02972 | 09/13/97 | 09:20:43 | HI | 0 | 44 | | | | |
| 25 | SB923_02972 | 09/13/97 | 09:21:25 | HI | 0 | 46 | | | | |
| 26 | SB923_02972 | 09/13/97 | 10:01:48 | ST | 92 | 0 | HWY 155 | HENRY | GA | 3004 |
| 27 | SB923_02972 | 09/13/97 | 10:54:28 | HI | 0 | 50 | | | | |
| 28 | SB923_02972 | 09/13/97 | 10:55:05 | HI | 0 | 50 | | | | |
| 29 | SB923_02972 | 09/13/97 | 10:55:40 | HI | 0 | 55 | | | | |
| 30 | SB923_02972 | 09/13/97 | 10:56:20 | HI | 0 | 17 | | | | |
| 31 | SB923_02972 | 09/13/97 | 11:09:20 | HI | 0 | 47 | | | | |
| 32 | SB923_02972 | 09/13/97 | 11:10:00 | HI | 0 | 45 | | | | |
| 33 | SB923_02972 | 09/13/97 | 11:10:42 | HI | 0 | 43 | | | | |
| 34 | SB923_02972 | 09/13/97 | 11:11:40 | HI | 0 | 41 | | | | |
| 35 | SB923_02972 | 09/13/97 | 11:12:21 | HI | 0 | 42 | | | | |
| 36 | SB923_02972 | 09/13/97 | 11:16:34 | HI | 0 | 44 | | | | |

CONT. FROM FIG.14A

| Id | Vehicle Name | Date | Time | Typ | Minutes | Speed | Address | County | State | Zip |
|---|---|---|---|---|---|---|---|---|---|---|
| 37 | SB923_02972 | 09/13/97 | 11:17:27 | HI | 0 | 44 | | | | |
| 38 | SB923_02972 | 09/13/97 | 11:18:07 | HI | 0 | 46 | | | | |
| 39 | SB923_02972 | 09/13/97 | 11:18:44 | HI | 0 | 50 | | | | |
| 40 | SB923_02972 | 09/13/97 | 11:19:36 | HI | 0 | 13 | | | | |
| 41 | SB923_02972 | 09/13/97 | 11:20:22 | HI | 0 | 47 | | | | |
| 42 | SB923_02972 | 09/13/97 | 11:21:01 | HI | 0 | 54 | | | | |
| 43 | SB923_02972 | 09/13/97 | 11:21:36 | HI | 0 | 54 | | | | |
| 44 | SB923_02972 | 09/13/97 | 11:22:11 | HI | 0 | 48 | | | | |
| 45 | SB923_02972 | 09/13/97 | 11:22:48 | HI | 0 | 49 | | | | |
| 46 | SB923_02972 | 09/13/97 | 11:23:32 | HI | 0 | 44 | | | | |
| 47 | SB923_02972 | 09/13/97 | 11:24:15 | HI | 0 | 43 | | | | |
| 48 | SB923_02972 | 09/13/97 | 11:24:59 | HI | 0 | 38 | | | | |
| 49 | SB923_02972 | 09/13/97 | 11:25:46 | HI | 0 | 36 | | | | |
| 50 | SB923_02972 | 09/13/97 | 11:34:20 | HI | 0 | 26 | | | | |
| 51 | SB923_02972 | 09/13/97 | 13:21:51 | ST | 212 | 0 | 3721-3583 MASTERS RD | DeKalb | GA | 3004 |
| 52 | SB923_02972 | 09/13/97 | 15:07:57 | HI | 0 | 40 | | | | |
| 53 | SB923_02972 | 09/13/97 | 15:09:15 | HI | 0 | 35 | | | | |
| 54 | SB923_02972 | 09/13/97 | 15:10:41 | HI | 0 | 40 | | | | |
| 55 | SB923_02972 | 09/13/97 | 15:11:40 | HI | 0 | 31 | | | | |
| 56 | SB923_02972 | 09/13/97 | 15:12:24 | HI | 0 | 43 | | | | |
| 57 | SB923_02972 | 09/13/97 | 15:13:04 | HI | 0 | 43 | | | | |
| 58 | SB923_02972 | 09/13/97 | 15:13:52 | HI | 0 | 40 | | | | |
| 59 | SB923_02972 | 09/13/97 | 15:14:35 | HI | 0 | 44 | | | | |
| 60 | SB923_02972 | 09/13/97 | 15:15:23 | HI | 0 | 44 | | | | |
| 61 | SB923_02972 | 09/13/97 | 15:16:03 | HI | 0 | 51 | | | | |
| 62 | SB923_02972 | 09/13/97 | 15:16:42 | HI | 0 | 43 | | | | |
| 63 | SB923_02972 | 09/13/97 | 15:17:28 | HI | 0 | 37 | | | | |
| 64 | SB923_02972 | 09/13/97 | 15:18:19 | HI | 0 | 36 | | | | |
| 65 | SB923_02972 | 09/13/97 | 15:20:45 | HI | 0 | 2 | | | | |
| 66 | SB923_02972 | 09/13/97 | 15:29:59 | HI | 0 | 48 | | | | |
| 67 | SB923_02972 | 09/13/97 | 15:30:38 | HI | 0 | 49 | | | | |
| 68 | SB923_02972 | 09/13/97 | 15:31:14 | HI | 0 | 54 | | | | |
| 69 | SB923_02972 | 09/13/97 | 15:31:51 | HI | 0 | 51 | | | | |
| 70 | SB923_02972 | 09/13/97 | 15:34:04 | HI | 0 | 47 | | | | |
| 71 | SB923_02972 | 09/13/97 | 19:46:53 | ST | 502 | 0 | OLD HUDSON BRIDGE RD | HENRY | GA | 3028 |

FIG.14B

Speed>69mph Report

| Vehicle Name | Date | Time | Speed | Driver |
|---|---|---|---|---|
| FB786_00147 | | | | |
| FB786_00147 | 7/18/97 | 08:37:48 | 71 | M.R. Holmes (Mike) |
| FB786_00147 | 7/18/97 | 08:39:36 | 73 | M.R. Holmes (Mike) |
| FB786_00147 | | | 73 | |
| FT175_04003 | | | | |
| FT175_04003 | 7/16/97 | 12:49:28 | 71 | Sam Williams |
| FT175_04003 | | | 71 | |
| FT181_03231 | | | | |
| FT181_03231 | 7/15/97 | 10:32:00 | 71 | Gail Mixson |
| FT181_03231 | 7/15/97 | 10:32:03 | 71 | Gail Mixson |
| FT181_03231 | | | 71 | |
| SB884_03151 | | | | |
| SB884_03151 | 7/15/97 | 17:24:14 | 75 | Doug Early |
| SB884_03151 | 7/22/97 | 16:13:20 | 71 | Doug Early |
| SB884_03151 | 7/22/97 | 16:13:46 | 72 | Doug Early |
| SB884_03151 | | | 75 | |
| SB924_05610 | | | | |
| SB924_05610 | 7/19/97 | 09:18:43 | 77 | Ellis Drew |
| SB924_05610 | | | 77 | |
| SB926_01971 | | | | |
| SB926_01971 | 7/18/97 | 12:43:54 | 75 | Allen Cole |
| SB926_01971 | 7/18/97 | 12:46:33 | 71 | Allen Cole |
| SB926_01971 | | | 75 | |
| SB931_04372 | | | | |
| SB931_04372 | 7/18/97 | 17:06:27 | 71 | Carrol Brooker |
| SB931_04372 | | | 71 | |
| SB932_00349 | | | | |
| SB932_00349 | 7/15/97 | 19:21:36 | 73 | Ronald Green |
| SB932_00349 | 7/15/97 | 19:23:23 | 71 | Ronald Green |
| SB932_00349 | | | 73 | |
| TR574_00853 | | | | |
| TR574_00853 | 7/15/97 | 17:54:25 | 71 | Jimmy T. Mann |

G.P.S. MANAGEMENT SYSTEM

CROSS-REFERENCE TO RELATED APPLICATIONS

This application is a continuation of U.S. application Ser. No. 11/318,112, filed Dec. 23, 2005 now U.S. Pat. No. 7,725,218, which is a continuation of U.S. application Ser. No. 10/006,655, filed Dec. 10, 2001 (now U.S. Pat. No. 7,272,493), which is a continuation of U.S. application Ser. No. 09/474,368 filed Dec. 29, 1999 (now U.S. Pat. No. 6,356,841). All of which are herein incorporated by reference in their entireties.

FIELD OF THE INVENTION

The present invention relates to an application of Global Positioning Satellite (G.P.S.) technology. More particularly, the present invention relates to a system for managing the tasks and understanding the behavior of its employees.

BACKGROUND OF THE INVENTION

Conventional G.P.S. systems generally include a single G.P.S. receiver. The receiver is in constant communication with a network of G.P.S. satellites. The G.P.S. satellites transmit signals, and based on those signals, the receiver determines its own position. In this way, the user of the G.P.S. unit can determine its position anywhere in the world.

One of the drawbacks of conventional G.P.S. systems is the local and isolated nature of the G.P.S. information. Currently, the position information is only sent to the local user and the location history, or where the user has been, cannot be determined. Furthermore, conventional G.P.S. systems do not allow centralized storage and processing of information and conventional G.P.S. systems cannot track multiple G.P.S. users. If G.P.S. technology were applied to a vehicle, present G.P.S. applications only allow the operator of the vehicle to how the present location of the vehicle.

These shortcomings of current, isolated G.P.S. units, makes management of multiple vehicles using G.P.S. information difficult or impossible because the G.P.S. information is not collected and analyzed.

SUMMARY OF THE INVENTION

The invention provides a system that can monitor and track one or more remote units h m a central location. The present invention includes provisions for collecting, remotely storing, transmitting, centrally storing and analyzing G.P.S. data and other data, from a central location. The invention uses GPS data, as well as other types of data, to ascertain the current, as well as past locations of the remote units.

In one aspect of the invention, the central location has at least one predetermined parameter with a range of values. The central location receives information from the remote units and compares that information with the predetermined parameter. If the information received from the vehicle is outside of the range of predetermined values, the system notes an exception.

In another aspect of the invention, a remote unit is equipped with an alert call functionality. The system includes provisions that allow technicians or users of the system to call for help by touching one button on a signaling device. The remote unit communicates the alert call to the central location and the central location contacts local authorities to send help. Optionally, G.P.S. data and other local information can also be forwarded to assist the local authorities. The signaling device can be a button disposed within easy reach of the technician or user or the signaling device can be a remote alert transmitter that wirelessly communicates with the remote unit.

In another aspect of the invention, the system includes provisions that allow information stored in the remote unit to be transmitted to the central location during periods of relative inactivity. This feature allows information to be transferred from the remote unit to the central location without interfering with the function of the system during busy or active periods of time.

BRIEF DESCRIPTION OF THE DRAWINGS

FIG. 8 is an example of a preferred a weekly division report, according to the present invention.

FIG. 9 is a continuation of FIG. 8 and is an example of a preferred weekly division report, according to the present invention.

FIG. 10 is an example of a preferred supervisor report, according to the present invention.

FIG. 11 is an example of a preferred weekly statistics report, according to the present invention.

FIG. 12 is a continuation of FIG. 11 and is an example of a preferred weekly statistics report, according to the present invention.

FIG. 13 is an example of a preferred daily route history report, according to the present invention.

FIGS. 14A and 14B show an example of a preferred route history report, according to the present invention.

FIG. 16 is an example of an exception report, according to the present invention.

DETAILED DESCRIPTION OF PREFERRED EMBODIMENTS OF THE INVENTION

I. Overview

Figure 1:
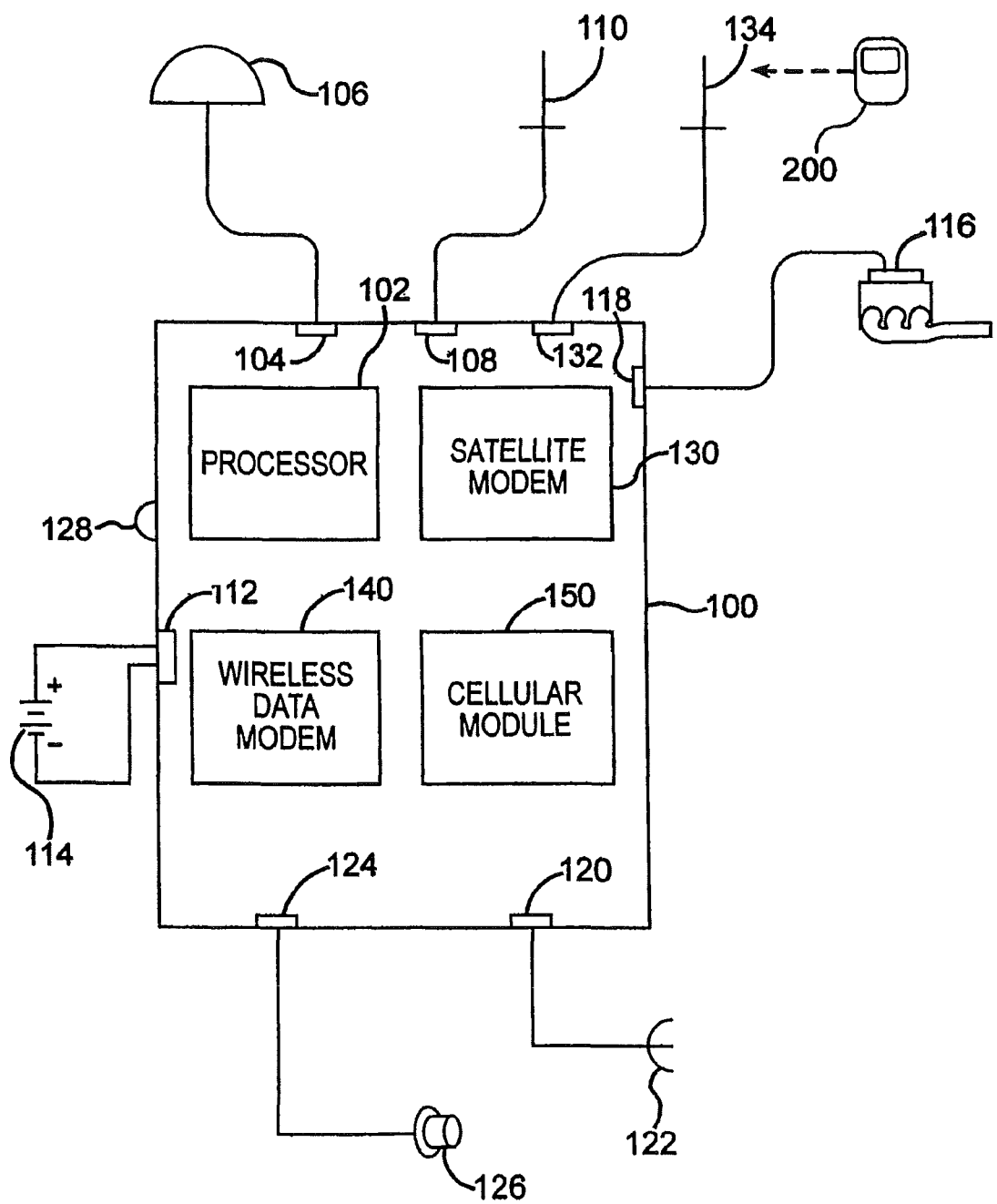
FIG. 1 is a schematic drawing of a preferred embodiment of an in-vehicle control unit according to the present invention.

The invention generally allows accurate and convenient tracking and management of multiple G.P.S.-equipped remote entities. The entity can be a vehicle, a person, or any other mobile object that has G.P.S. equipment. The system can track G.P.S. information only, other non-G.P.S. information only, or a combination of G.P.S. information and other non-G.P.S. information. While the invention has broad application to any mobile entity, for purposes of clarity the following disclosure will be limited to a preferred embodiment of the invention: a G.P.S. equipped vehicle.

In the preferred embodiment, the system tracks various parameters of a vehicle at all times, including both G.P.S. and non-G.P.S. information. The system monitors a vehicle's location, speed, and information regarding other vehicle subsystems such as the ignition switch. Preferably, this information is collected by devices located within or on the vehicle. The information is then transmitted directly to a central location, or stored in the vehicle and transmitted at different times and even by different formats.

II. Exception Tracking

The information is preferably collected at a central location and analyzed, Given the G.P.S. information and the ignition information, the behavior of the h v e r and technicians can be evaluated.

The invention includes provisions to simplify the amount of information that needs to be reviewed by managers. To simplify the analysis of the data by management personnel and to reduce the data to instances where management should be informed of certain types of behavior, the invention prefers the use of exception tracking.

Exception tracking is when ordinary behavior or conditions are ignored and only events that fall outside certain predetermined boundaries are displayed or highlighted. In other words, exceptions are events or conditions that result from a violation of predefined parameter thresholds.

Preferably, the system tracks exceptions by analysis of vehicle location data, ignition on and off transitions, and other vehicle data provided by the G.P.S. equipment.

Exceptions are determined by comparing the data obtained from the vehicle with exception parameters that are predefined individually for each vehicle or for groups of vehicles. In order to facilitate easy programming of the predefined parameters, the use of graphical user interfaces is preferred. Authorized users can define exception parameters. Exceptions can be processed as soon as the data is collected or exceptions can be stored and then processed at once. This processing can occur at predetermined periods of time, for example, every hour, every shift, or every day. Preferably, exception processing occurs as soon as the data is received from a vehicle.

At the beginning of a typical day or shift, the first ignition event, preferably determined by sensing a change in the vehicle's ignition switch, of the day or shift coupled with the time the vehicle leaves the service center could be used to determine the start of the driver's work day or shift. The system preferably includes an appropriate graphical user interface that allows authorized users to specify service center and shift parameters for individual vehicles or groups of vehicles.

A service center location can be designated in many suitable ways. The service center location could be selected from a drop down menu or, preferably, by selecting a point on a graphical map display.

Shift parameters include thresholds for establishing a late departure time and an early return time to the service center. In other words, the system could be programmed with a certain predetermined time, for example 8:30 am, the time when drivers and technicians for a given shift are expected to start their routes. If a vehicle were to use its ignition and leave the service center after 8:30 am, an exception would be logged. The start time, as well as every other shift parameter, can be customized and changed to suit any particular application, vehicle, group of vehicle or shift.

Similarly, the time the vehicle returns to the service station in the evening can also be monitored. The vehicle return time could be determined by an ignition off event that occurred within a certain proximity to the service station. By using both the ignition off information and the G.P.S. location information, the system can determine when a vehicle has been returned to the service center. As with all of the other parameters, the system can be programmed with a preselected return time, for example, 5:30 pm. And in this case, any vehicle returned too early, for example, before 5:30 pm would be noted by the system as an exception.

In addition to the exceptions noted by the system, the system also maintains a record of departure and arrival times for all of the vehicles. The system records the time at which a vehicle leaves the service center at the beginning of a shift and the system records the time at which the vehicle returns to the service center.

Authorized users can specify the accuracy of this data. In other words, authorized users can specify the time measuring parameter. For example, if an authorized user specified 10 minutes as the time measuring parameter, then all of the data would be accurate to the nearest 10 minute interval. Similarly, if the authorized user specified a time measuring parameter of one hour, the data would be accurate to the nearest hour. Clearly, any suitable time measuring parameter could used.

During the day, the vehicle speed could be determined based on time and location information retrieved from the G.P.S. system and sent to the central location by the vehicle. The system preferably includes an appropriate graphical user interface to allow authorized users to specify excessive speed parameters for individual vehicles or groups of vehicles.

The excessive speed parameter can be varied and is adjustable within a range of values. Preferably, the range is from 5 miles per hour to 100 miles per hour. When the excessive speed parameter is exceeded, the excessive speed exception is noted and logged for that vehicle, along with a time stamp and location information.

The system can also monitor idle time. The idle time feature determines if a vehicle has been at a stationary point for an extended period of time. Using this feature, the system informs users if a driver is possibly participating in activities that are outside the scope of the employee's duties. For example, the idle parameter could be set for two hours and any vehicle idle for more than two hours would be noted as an exception.

The idle feature can also be combined with the location information. The idle parameter could be adjusted based on location. For example, if the vehicle is in the parking lot of a movie theater and is idle for one hour, half of the idle time generally permitted, the system may note an exception.

The system also includes provisions for monitoring certain regions by placing a parameter around those areas or regions. Those regions would be monitored and if the vehicle reaches that region (for example, a restricted region) or if the vehicle fails to reach that region (for example, a client site), than an exception would be noted.

The system preferably includes an appropriate graphical user interface that allows authorized users to specify stationary point parameters for individual vehicles or groups of vehicles. The length of time can be adjusted to any desired value. For example, the maximum permitted stationary time can be adjustable within a range of values between 3 minutes and 300 minutes, with an additional option for no time limit. The no time limit feature effectively cancels the idle time feature.

When the maximum permitted stationary time parameter is exceeded without movement of the vehicle, the stationary point exception is logged for that vehicle. Movement can be defined in many ways and the definition of movement can be adjusted. In a preferred embodiment, the definition of movement, for purposes of the stationary point parameter, is a location change greater than the maximum resolution of the G.P.S. receiver.

Grouping is another phenomenon monitored by the system. Grouping is when multiple vehicles are in close proximity to one another. The G.P.S. system according to the invention, analyzes the route histories of every vehicle in a district or division to determine if multiple vehicles have been stationary at the same location at the same time during the day. The system preferably includes a graphical user interface that allows authorized users to specify co-location distance and duration parameters for individual vehicles.

The co-location distance between vehicles can be adjusted to any desired range, for example the co-location distance could range between 50 to 1500 feet. Likewise, the minimum co-location duration, or the time the group of vehicles needs to be within the co-location distance can also be adjustable. For example, a range of values from 5 minutes to 2 hours could be used.

If two or more vehicles are stationary within the defined distance of each other at the same time and remain so for more than the defined duration, the Group of Vehicles (GOV) exception is recorded for all of the co-located vehicles in the group.

The system can also utilize the service center and shift parameters defined for the "Out of Gate/Back to Barn" exception to track revisits to the service center. The triggering event is when a vehicle is located at the service center after the "Out of Gate" time. An exception can be logged for that event alone. However, additional parameters, like the duration of the visit and additional revisits can also be used to avoid unnecessary recording of minor or permissible revisits.

For example, the duration time could be set to any desired time. The invention contemplates a range of between 1 and 120 minutes, and preferably around 3 minutes. In other words, in the preferred embodiment, an exception would only be logged if the vehicle remained at the service center for more than 3 minutes.

Similarly, the number of revisits could also be selected. The excessive revisits parameter can be adjusted within a range of values from 1 to 10 revisits to the service center. For example, if the revisit parameter were set to two revisits, no exception would be logged unless the vehicle returned to the service center two or more times during a shift. Of course the number of revisits could be adjusted and changed to suit particular conditions. In other words, the system would assume, if the number of revisits parameter were set to two, that the first revisit would be legitimate and any additional revisits questionable and requiring management scrutiny.

In addition to logging the exceptions to the revisit parameter, the system also maintains a record of the number and duration of revisits to the service center for every vehicle.

Like the other parameters, the system preferably includes an appropriate graphical user interface that allows authorized users to specify excessive revisit parameters for individual vehicles or various groups of vehicles.

Windshield time is a parameter that measures the amount of time the vehicle is actually driven. The system preferably includes an appropriate graphical user interface that allows authorized users to specify windshield time parameters for individual vehicles or groups of vehicles.

The windshield time parameter can have a range of values and preferably can be adjustable within a range of 1 hour to 8 hours of total driving time. When the actual windshield time falls outside the parameter, the system logs a windshield time exception. Actual windshield time can be determined in many ways, but is preferably determined by using travel time and distance.

The ignition on parameter measures the total or cumulative time running time of the vehicle. The system preferably includes an appropriate graphical user interface that allows authorized users to specify cumulative ignition on time parameters for individual vehicles or groups of vehicles.

The parameter can be adjusted for different situations. Preferably, the cumulative ignition on time is adjustable within a range of values from 15 minutes to 8 hours. The cumulative ignition on time is determined by adding all of the ignition on intervals for a given time period. Preferably, this time period is either a calendar day or a shift.

When the cumulative ignition on time exceeds the windshield time by a specified value, the system notes an exception. Even if the cumulative ignition on time is within the selected parameter, the system records the cumulative ignition on time.

The mileage parameter measures the total number of miles traveled by a vehicle during a preselected time interval. The interval can be a calendar day, a shift, or any other desired time interval. The system preferably includes an appropriate graphical user interface that allows authorized users to specify cumulative ignition on time parameters for individual vehicles or groups of vehicles. Any desired mileage parameter can be set, however, an adjustable range of between 10 miles to 500 miles is preferred. The system logs the total number of miles and also logs exceptions when the actual mileage falls outside the preset mileage parameter.

If the G.P.S. signal were lost during the day, for example, if the vehicle enters a basement of a building, that event would be logged along with a time stamp. Preferably, a lost G.P.S. signal event also includes the situation where the G.P.S. receiver equipment on a vehicle is incapable of accurately determining vehicle location. Preferably, the initial warm-up and lock-on times following an ignition on event would not be considered a loss of G.P.S. signal. The I.C.U. stores a loss of G.P.S. signal exception report with a time stamp when the G.P.S. receiver is incapable of accurately determining the vehicle location. All G.P.S. data received by the In-Vehicle Control Unit (ICU) from the G.P.S. receiver includes the G.P.S. signal status information. The signal status is used to determine the accuracy of the vehicle location. If the G.P.S. signal status is determined to be inaccurate, an exception report is logged by the system. Conventional G.P.S. receivers send out an error codes when they are unable to accurately determine their own location. The ICU uses this conventional feature of G.P.S. receivers to determine a loss of G.P.S. signal. An indication that the G.P.S. signal had been lost and the associated time can also be provided on all of the various reports for the vehicle or technician.

III System Components

The invention includes various components that support the functions disclosed above. In the preferred embodiment, the components include an in-vehicle control unit, a remote alert transmitter and a central office.

A vehicle according to the invention, preferably includes provisions that allow the vehicle to receive data from various sources and provisions that allow the vehicle to communicate with other vehicles, with a central office, and with others via a cellular phone connection. Preferably, all of these functions are handled by a single unit, the in-vehicle control unit, ICU 100, shown schematically in FIG. 1. The ICU 100 is preferably located either underneath the front passenger seat or attached to the back of the front passenger seat.

The ICU 100 includes various connections. One connection 108 is adapted to receive an antenna 110. Similarly, there is a connection 104 for the G.P.S. receiver 106. A connection 112 accepts power from a motor vehicle battery 114. An ignition sensor 116 communicates with the ICU 100 via connection 118. The ignition sensor 116 determines if an ignition on event or an ignition off event has occurred. There is also, preferably, a handset connection 120 for a cellular telephone handset 122. The ICU 100 also includes an alert call connection 124 that receives the input of an in-vehicle alert call button 126. The ICU 100 has a security tag 128 that is tamper-evident.

The ICU 100 also has components that perform the computing and communications tasks. In addition to a processor 102, the ICU can optionally have at least one or more of the following components: a satellite modem 130, a wireless data modem 140, a cellular module 150, and/or a G.P.S. receiver 106. The ICU 100 also includes an antenna connection 132 for an RF antenna 134 to receive signals from a remote alert transmitter 200. Preferably, the processor 102 is an Intel x386 based processor, and the G.P.S. receiver 106 is a 12 channel receiver. The cellular module includes a cellular modem and a cellular telephone system. Preferably, the ICU 100 includes every communications component for which service is available in the particular area where the ICU 100 is used. In an exemplary embodiment of the invention, the ICU 100 includes all of the communications components.

While the in-vehicle alert button allows technicians and users to call for help while they are in the vehicle, the invention also includes provisions that allow users or technicians to call for help or request immediate assistance even when they are outside of the vehicle or away from the vehicle. Preferably, a remote alert transmitter (RAT), small enough to be carried on a person, can be used to activate the alert call.

Figure 2:
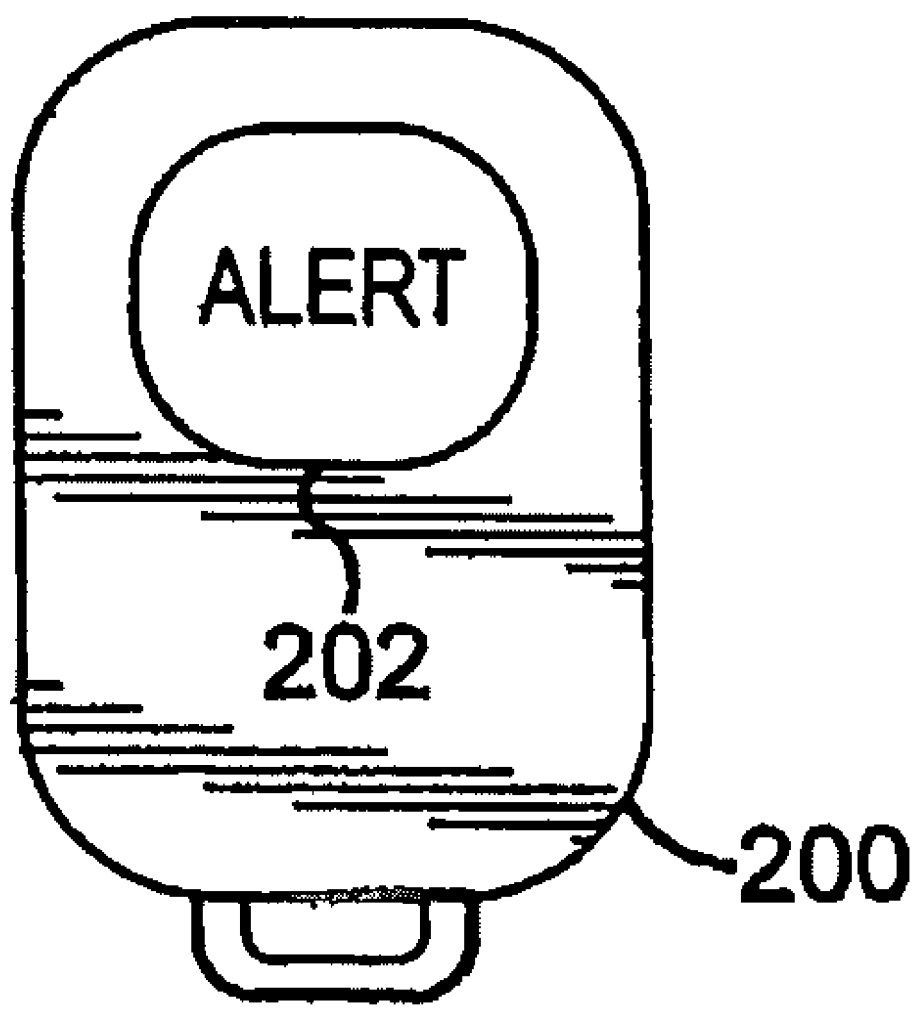
FIG. 2 is a top view of a preferred embodiment of a remote alert transmitter according to the present invention.

Physically, the RAT 200 is approximately the size and shape of a keyless entry key fob. It is preferably smaller than a conventional pager, and is small enough to be carried in a pocket or attached to a belt by a belt clip. As shown in FIG. 2, the RAT includes a prominent button 202 that is used to send a signal to the ICU 100. The signal can be carried on any electromagnetic wave, although a radio frequency signal is preferred.

Figure 19:
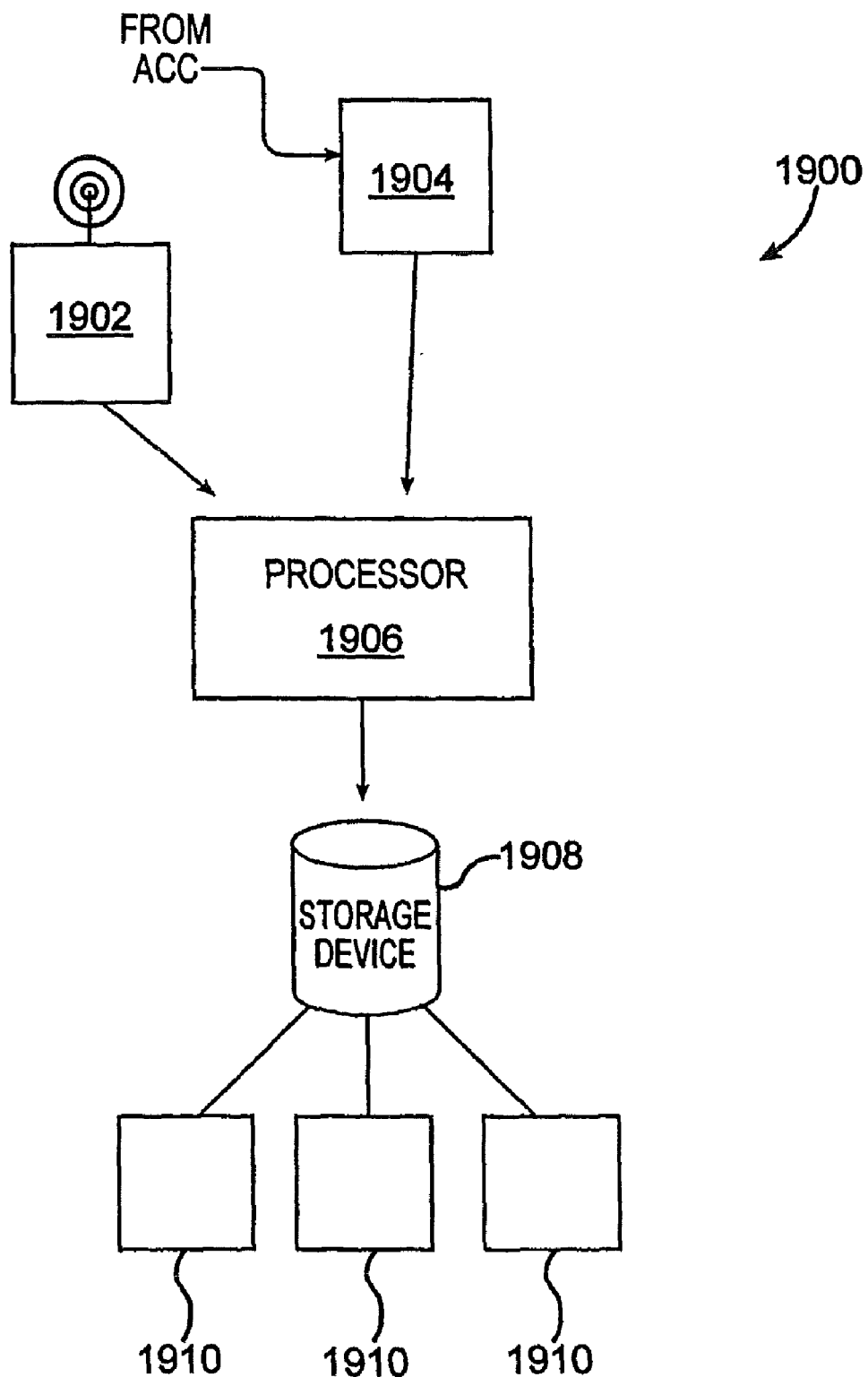
FIG. 19 is a schematic diagram of a preferred embodiment of a central office, according to the present invention.

The system preferably includes a central office. Referring to FIG. 19, which is a schematic diagram of a preferred central office 1900, the preferred central office includes provisions to receive and process information sent to it by the other components of the preferred system.

The preferred central office 1900 includes a wireless communications device 1902. This device permits the central office 1900 to communicate with ICU's deployed throughout a region. The wireless communications device 1902 can function using any desired communications medium or protocol including satellite, cellular, and/or wireless data network. Cellular and/or wireless data network are preferred. Preferably, the ICU's use Mobitech modems to transmit information to the central office 1900 and the wireless communications device 1902 includes provisions that allow it to communicate with the Mobitech modems. The wireless communications device 1902 can receive data in any format. However, preferably the wireless communications device 1902 receives data as a flat file.

Figure 3:
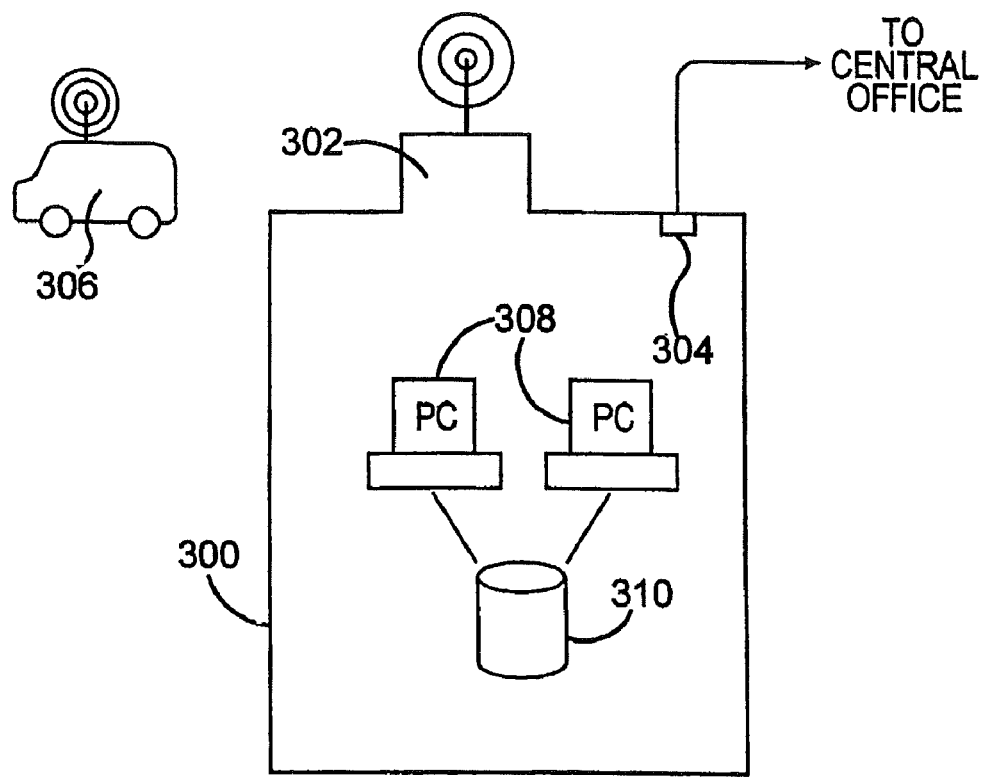
FIG. 3 is a schematic diagram of a preferred embodiment of an alert call center, according to the present invention.

A second communications device 1904 provides an interface to the alert call center 300 (see FIG. 3). The second communications device 1904 assists the central office 1900 in receiving information from the alert call center 300. The second communications device 1904 can receive data from the alert call center 300 in any suitable format or protocol, however a TCP/IP connection to the alert call center 300 is preferred. The alert call center 300 is disclosed in greater detail below.

Both of the communications devices 1902 and 1904 send data collected from their respective sources to a processor 1906. Processor 1906 can be a discrete computer or a computer component or could be an application running on a computer system. Processor 1906 receives information from the two communications devices 1902 and 1904 and prepares the information for storage in storage device 1908. Storage device 1908 can be a server or a database. Once the information is stored on storage device 1908, applications 1910 communicate with storage device 1908 to prepare reports and perform other functions with the information on storage device 1908. The applications 1910 preferably prepare the reports disclosed below and shown in FIGS. 7-18.

IV. Alert Calls

The invention includes provisions that allow a technician to signal an alert that results in the immediate transmission of an alert call message. There are many ways a technician can signal an alert. Alerts could also be automatically generated by the system based upon certain predetermined conditions. Preferably, there are at least two alert signaling devices. The first is an alert button located in the vehicle, and the second is a wireless device that is preferably small and worn by the technician, such as a remote alert transmitter (RAT). Both of these devices will be described in greater detail below.

When an alert call message is generated, that message is transmitted to the appropriate Alert Call Center or ACC. Preferably, the alert call message is transmitted via a wireless data system or via satellite. If the wireless data system or satellite coverage is not available, the alert call message is preferably then transmitted via a cellular telephone network to the appropriate ACC.

The ACC can be separate from the central office, coincide somewhat with the central location (in other words, portions or elements of the ACC and the central office share facilities or resources), or be part of the central office.

FIG. 3 shows a schematic diagram of a preferred embodiment of an ACC 300. The alert call center 300 includes devices that allow it to communicate with various other components of the preferred system, including a wireless communications device 302, and a connection 304 for communicating with a central office 1900 (see FIG. 19). The wireless communications device 302 is designed to wirelessly communicate with an ICU 100 (see FIG. 1) equipped vehicle 306. Any wireless transmission medium or protocol may be employed. However, a wireless data network and/or cellular network is the preferred wireless transmission medium of the present invention.

A number of administrators using a suitable number of personal computers 308 monitor the status of vehicles and technicians and watch for technicians who request assistance. The personal computers 308 are preferably equipped with web browsers so that the administrators can search and update emergency contact information. The administrators also have access to one or more databases that contain relevant information. In the preferred embodiment, the administrators have access to a database 310 that contains information regarding the attributes of every technician within their region. Preferably, the administrators also have access to a G.I.S. (Geographical Information Street Map) system that allows the technicians to graphically display street maps. The preferred embodiment also provides administrator access to ESN (Emergency Services Number) and/or PSAP (public Safety Answering Point) information. Preferably, the ACC 300 is in communication with the central office 1900 (see FIG. 19) via a connection 304.

The contents of the alert call message can be varied to suit a particular application. Preferably, the alert call message includes the current location of the vehicle, the vehicle identifier, the technician identifier, and the cellular telephone number of the vehicle.

The operating times of the ACC can be adjusted to suit particular needs and budgets. However, the preferred embodiment of the invention envisions an ACC that monitors alert calls 24 hours per day, 7 days per week. Preferably, the ACC is capable of monitoring the entire operating region of the system, or the company employing the system, and is arranged in a manner that allows personnel working at the ACC to have ready access to the signaling technician's attributes that permit the identification and contact of the technician based on the content of the alert message.

Preferably, the ACC has the ability to quickly determine the street address of the vehicle location based on the content of the alert message. Additionally, as noted above, the ACC preferably has ready access to the appropriate emergency telephone numbers for any vehicle location monitored by the ACC.

Figure 4:
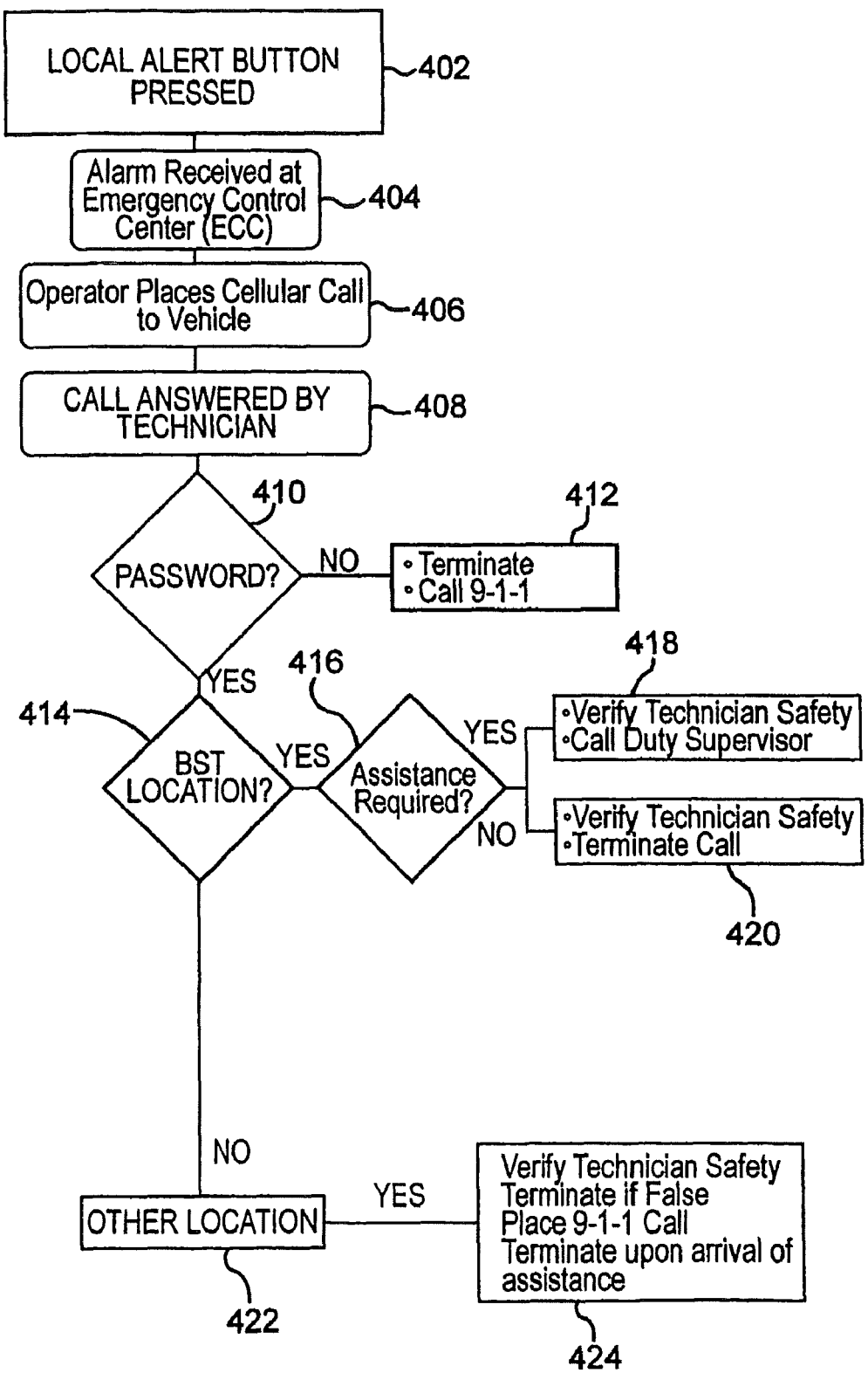
FIG. 4 is a flow diagram for a first scenario of a preferred embodiment of an alert call center, according to the present invention.
Figure 5:
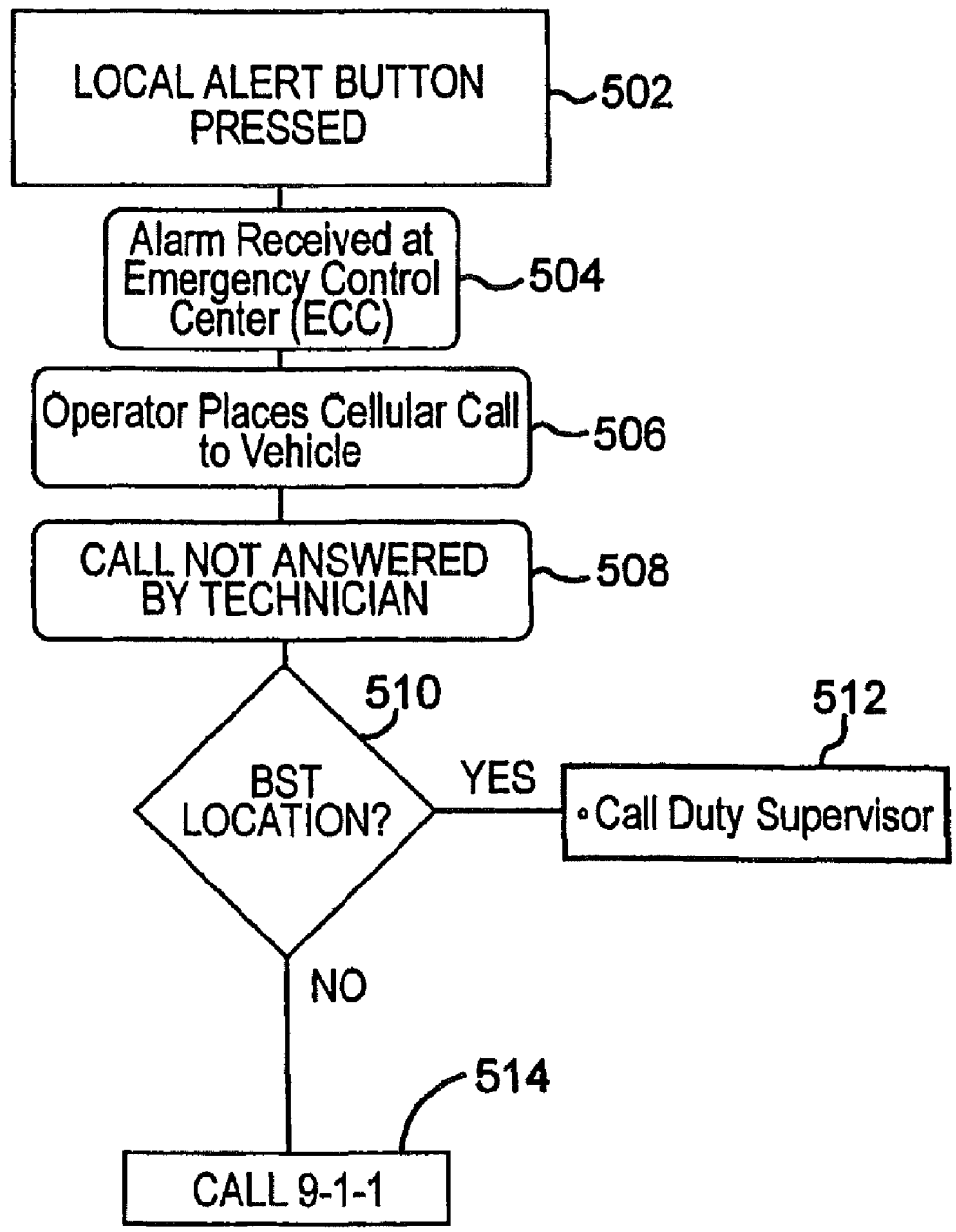
FIG. 5 is a flow diagram for a second scenario of a preferred embodiment of an alert call center, according to the present invention.
Figure 6:
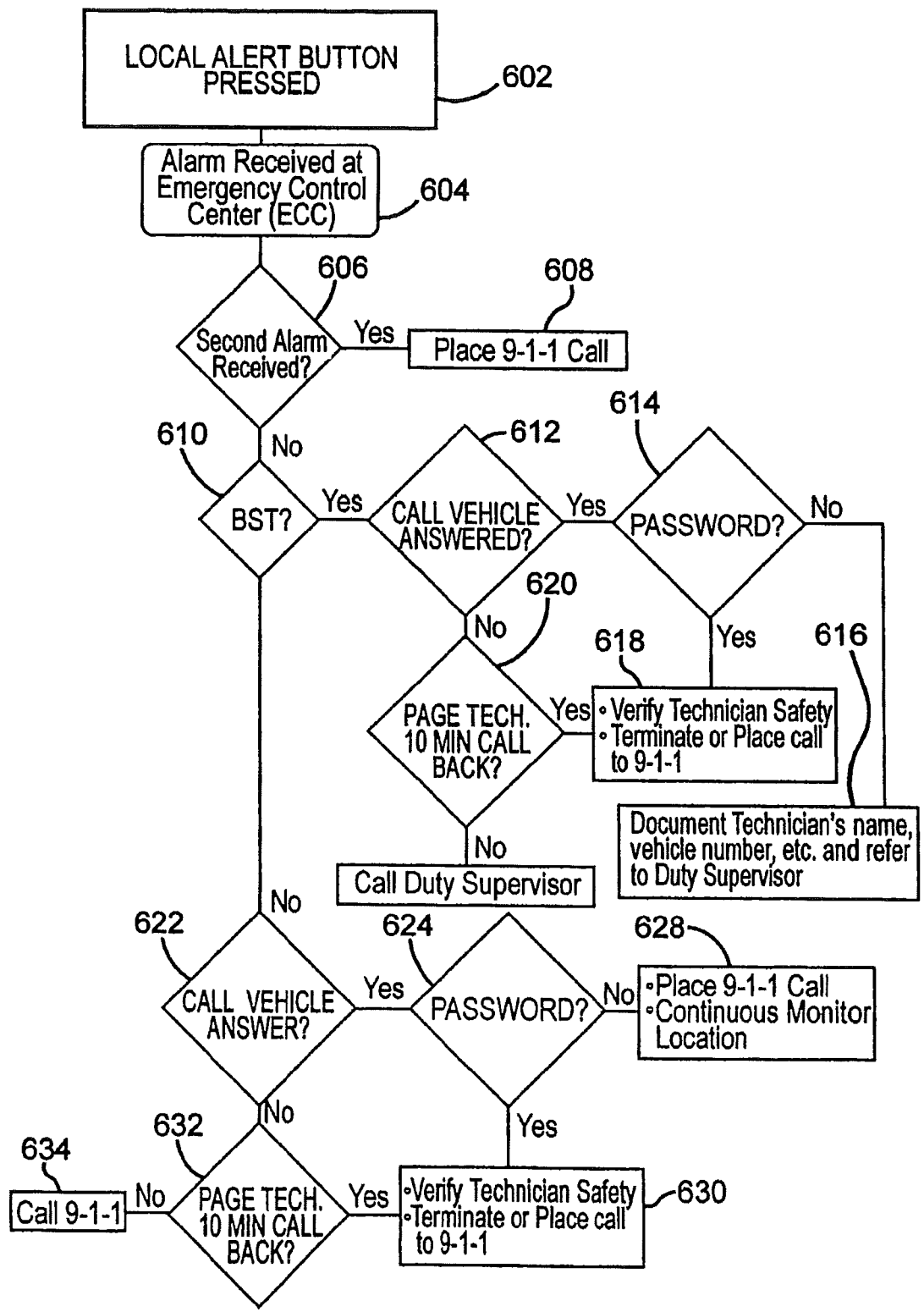
FIG. 6 is a flow diagram for a third scenario of a preferred embodiment of an alert call center, according to the present invention.

FIGS. 4-6 are flow diagrams showing the steps the ACC preferably follows to process alerts received from vehicles. In FIGS. 4-6, an alert has been transmitted to the ACC, the alert has been received by the ACC and an ACC operator has called the vehicle that originated the alert message. FIG. 4 shows the preferred steps that are followed if a technician answers the call placed by the ACC operator. FIG. 5 shows the preferred steps that are followed if the call from the ACC operator is not answered by the technician. And FIG. 6 shows an alternate embodiment and the preferred steps that are followed after an alert message has been received. FIG. 6 discloses the steps that are preferably followed when a second alert message is received from the same vehicle. The embodiment shown in FIG. 6 can be a separate embodiment, or the steps shown in FIG. 6 can be combined with other embodiments such as the embodiment shown in FIGS. 4 and 5, so that other embodiments can include a procedure to deal with second alerts received from the same vehicle.

Referring to FIG. 4, a local alert button is pressed in step 402 and an alarm is received at the ACC in step 404, initiating action by ACC operators. The ACC is also sometimes referred to as an Emergency Control Center (ECC). In step 406, ACC operators place a cellular call to the technician's vehicle that originated the alert. Assuming that the call is answered by the technician in step 408, the ACC operator asks for a password in step 410. If a password is not given or is incorrect, then the call is terminated and the ACC operator calls 911 or another emergency number in step 412. If the password is correctly given, then the ACC operator determines if the vehicle is at a company location in step 414.

If, in step 414, the vehicle is determined to be at a company location, then in step 416 the ACC operator asks if assistance is required. A company location is any location that is within the control of the company, and has supervisor on staff at that location. If the technician indicates that assistance is required, then in step 418 the ACC confirms the safety of the technician and calls the supervisor or manager of the facility where the vehicle is located. If the technician indicates that assistance is not required, the ACC operator still confirms the safety of the technician and terminates the call.

In step 414, the ACC operator determined if the vehicle was at a location other than a company location. Step 422 is the step after the ACC operator has determined that the vehicle is at a location other than a company location, and the ACC operator follows the procedures disclosed in step 424. In step 424 the ACC operator verifies the safety of the technician. If the alert was sent in error, or the alert was false for some other reason, then the alert session is terminated. Additionally, in step 424 if the technician requests assistance, the ACC operator calls 911 or another emergency number and requests that assistance be sent to the vehicle. The alert session is terminated upon arrival of the assistance.

Referring to FIG. 5, a local alert button is pressed in step 502 and an alarm is received at the ACC in step 504, initiating action by ACC operators. ACC operators place a cellular call to the technician's vehicle that originated the alert in step 506. In this case, the ACC determines that the call is not answered by the technician in step 508. The ACC operator determines if the alert was sent by a vehicle located in a company location in step 510. If so, the ACC operator informs the supervisor or manager of the facility to assist the technician in step 512. If the vehicle is not at a company location, then the ACC operator calls 911 or another emergency number and requests that assistance be sent to the vehicle in step 514.

Referring to FIG. 6, a local alert button is pressed in step 602 and an alarm is received at the ACC in step 604. In this embodiment, if a second alarm is received in step 606, then the ACC operator calls 911 or another emergency number and requests that assistance be sent to the vehicle in step 608. If a second alarm is not received, then the ACC operator determines if the vehicle is located in a company location in step 610.

If the vehicle is at a company location, then the ACC operator calls the vehicle in step 612. If the ACC operator's call is answered by the technician, in step 614 the ACC operator asks for a password: If a password is not given or is incorrect, then in step 616 the ACC operator notifies the supervisor or manager of the facility and documents information related to the alert call. If the password is given correctly, then in step 618 the ACC operator verifies the safety of the technician and either terminates the call or calls 911 or another emergency number if necessary.

If the call is not answered by the technician in step 612, then in step 620 the ACC operator waits for a call back within 10 minutes. If the technician answers the page and calls the ACC back, then the ACC operator verities the safety of the technician and either terminates the call or calls 911 mother emergency number in step 618, if necessary. If the technician fails to return the page, then the ACC operator notifies the supervisor or manager of the facility 622.

If the vehicle is at a location other than a company location, in step 622 the ACC operator calls the vehicle. If the ACC operator's call is answered by the technician, the ACC operator asks for a password in step 624. If a password is not given or is incorrect, then the ACC operator calls 911 or another emergency number in step 628 and monitors the location of the vehicle. If the password is correctly given, then the ACC operator verifies the safety of the technician and either terminates the call or calls 911 or another emergency number in step 630, if necessary.

If the call is not answered by the technician in step 622, then the ACC operator waits for a page tech. call back within 10 minutes in step 632. If the technician answers the page and calls the ACC back, then the ACC operator verifies the safety of the technician and either terminates the call or calls 911 or another emergency number in step 630, if necessary. If the technician fails to return the page, then the ACC operator calls 911 or another emergency number in step 634.

V. Communications

The system can be implemented using a single communications medium or by using a variety of different communications media that allow communications between the central office and the vehicles. In the preferred embodiment, the system uses a variety of communications media. The system has the capability for transmitting and receiving data between the ICU and the data servers over various transmission media, including cellular, wireless data network, and satellite. Preferably, every vehicle contains a cellular modem and a wireless data modem, and each ICU incorporates provisions that either allow transmission via a satellite network or provides convenient upgradability to satellite communication.

The system preferably uses a cellular telephone network for two way data transmission between the central office and the ICUs. The cellular telephone network preferably provides full duplex, two-way voice communication.

The vehicles may have the capability of communicating using a wireless data network. As noted above, the vehicles are preferably equipped with a wireless data modem. The wireless data network is the preferred data communication medium. However, if a wireless data network is not available, satellite networks may be utilized.

Vehicles may also communicate using a satellite network. Those vehicles that communicate using a satellite network are preferably equipped with a satellite modem.

VI. Power Conservation Features

The invention includes provisions to conserve power. When the system detects an ignition off condition, the system processes all of the computing steps associated with the detection of an ignition off condition, and then the ICU enters a "sleep" mode in order to reduce power consumption. When in sleep mode, power shall be supplied only to those components that must still function when the vehicle is not moving.

During the "sleep mode" the alert call features, including the RAT (Remote Alert Transmitter) button, still function. "he preferred way the system allows the alert call feature to function during a state of "sleep," such that the system comes out of sleep mode when the system senses an activation of a technician alert call, either from an in-vehicle button or a remote button, and the ICU comes out of the sleep mode long enough to perform alert call processing functions.

System parameters, location of the vehicle, and other stored data is maintained while the ICU is in sleep mode. Turning the vehicle ignition on causes the ICU to come out of the sleep mode and resume normal processing. Preferably, the ICU is designed to conserve power during all of its operating modes. Primary vehicle power consumption by all G.P.S. components within the vehicle should not to exceed 1 Amp hour for any twenty-four hour period.

VII. Daily Batch Upload

The system includes provisions that allows the vehicles to send daily history information to the central office. Although this daily transmission can occur at any time, it is preferred that the daily upload does not intrude into the function of the system during periods of active operation of the vehicle. The timing of the daily batch upload should preferably be coordinated to coincide with those times when the vehicle is not operational. For example, if a particular vehicle is scheduled to be operational from 8:00 am to 6:00 pm, that would mean that the vehicle is likely to be inactive from 6:00 pm, through the night, until 8:00 am the next morning. The timing of the daily batch upload would be selected to occur during that period of inactivity.

Generally, during these periods of inactivity, the vehicle will be in sleep mode. The system includes provisions that brings the vehicle out of sleep mode to perform the daily batch upload. Preferably, an automatic timer in the ICU 100 wakes the vehicle up and brings the vehicle out of sleep mode.

Any type of information can be uploaded from the vehicles to the central office during the daily batch upload. However, a comprehensive data dump including the following items of information are preferably transferred from the vehicle to the central office: daily history of location reports, ignition on and off transitions, alert calls, and other routine data.

Any type of communications medium can be used to perform the daily batch processing, however, the invention prefers the use of a cellular network for daily batch uploading. In an exemplary embodiment of the invention, packetized data is transmitted via the cellular network to the central office.

The system preferably includes an appropriate graphical user interface that allows authorized users to specify the time the daily batch upload takes place for individual vehicles or groups of vehicles.

Daily batch uploads can be performed using the server "dial out" mode of establishing the connection between the central office and ICU. One way of implementing the "dial out" mode is to define a predetermined time when the central office will try to contact the ICU. The ICU, using its automatic timer, wakes up a short time before the predetermined time and awaits a communication from the central office. The central office then, at the predetermined time, contacts the ICU and requests a daily batch upload. The system can either initiate a central office to ICU transmission or an ICU to central office transmission. Preferably, the ICU initiates the daily batch upload during off-peak times.

VII. Near Real Time Data Upload

Another feature of the present invention is the ability of the system to obtain information about all of the various vehicles in near real time. To accomplish this, the system includes provisions that allow vehicles to transfer information in near real time to the central office. The wireless data network or the satellite network is the preferred communications medium for this task.

Although many types of information could be transferred in near real time to the central office, the invention prefers the near real time transmission of the following items of information: location information, ignition on and off transitions, alert calls, and other specified data in near real time.

VIII. Data Output, Reports

The invention includes provisions for generating reports. Any type of report can be produced using the data collected from the vehicles. Four specific types of reports that may be produced include a route history, an exception report, a periodic productivity analysis report, and an administrative report. Other reports may be generated by the system.

Preferably, the reports are tailored to suit the organizational structure of the company employing the system. The following description of a preferred embodiment illustrates one application of the G.P.S. management system where a company's organizational structure includes technicians who report to supervisors, who in turn, report to managers. One supervisor is charge of about ten technicians and one manager oversees about ten supervisors.

The system preferably includes security options that limit the access of the system to authorized users. The system includes provisions that only allow supervisory and management users to access specific technicians and vehicles that are within the supervisor's or manager's organization. Preferably, the system includes a four tier hierarchy with system access granted according to standard protection procedures.

Given the preferred organizational structure, the following reports may be generated. Beginning with the manager, managers could access the system and, among other options, view the reports online or print the reports. Preferably, the same information would be available in either format. If the reports are viewed on line, the reports would preferably allow the manager to use the online report to navigate to other portions of the report being viewed or to navigate to other reports.

Figure 7:
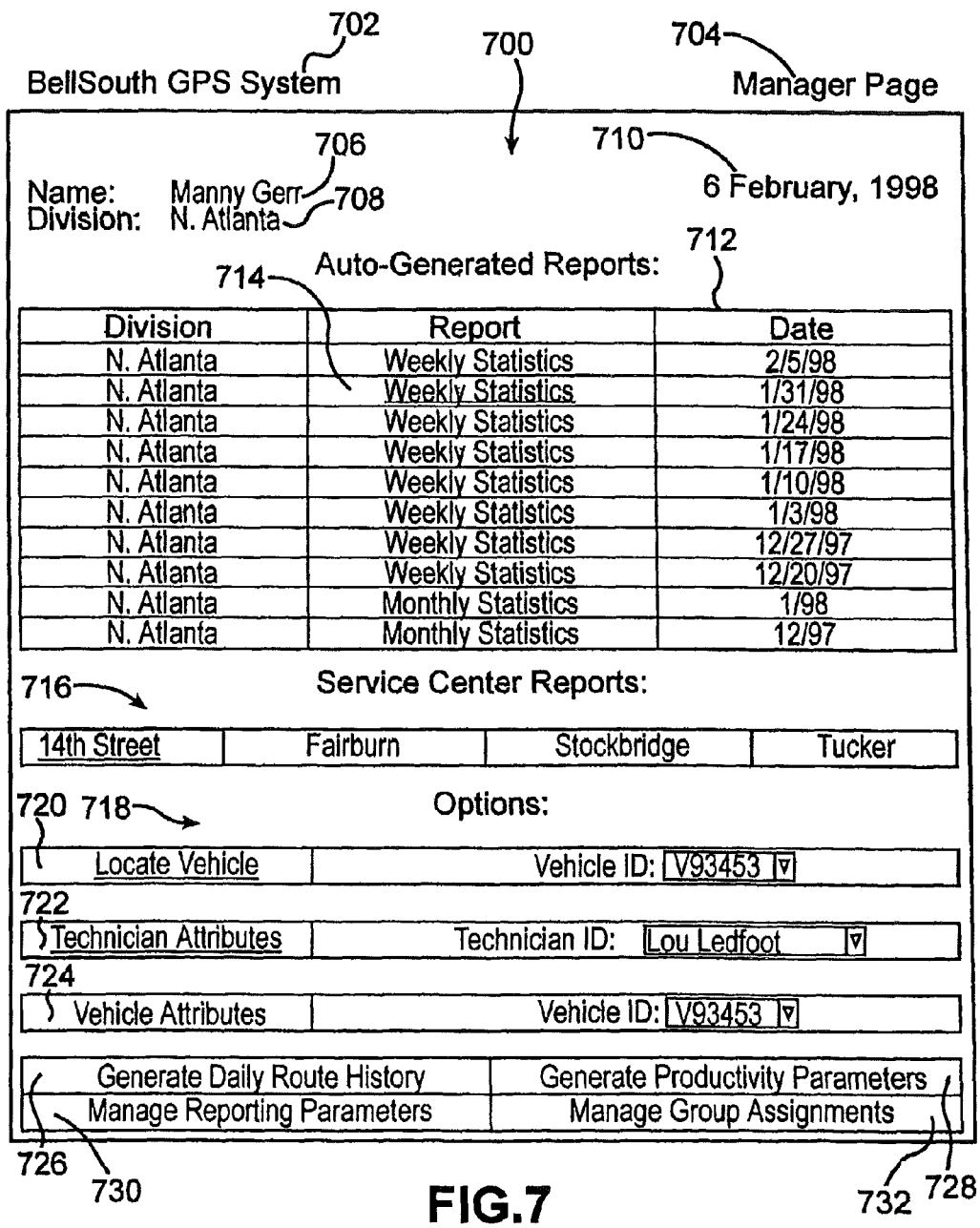
FIG. 7 is an example of a preferred manager report, according to the present invention.

FIG. 7 shows an example of a manager report 700. The manager report 700 includes a system name 702—in this Example, the system name is "BellSouth GPS System." The manager report 700 could also include a reference name 704 of the report. In this embodiment, the reference name 704 of the report is "Manager Page." The manager report 700 can also preferably include the name of the manager 706, the division or branch 708 to which the manager is assigned, and a date 710.

Manager report 700 could also include a list of other reports 712 that may be of interest to the manager. In the example shown in FIG. 7, the list of other reports 712 includes weekly and monthly statistics for different periods of time, for the particular division that manager oversees. As shown in the manager report 700, that particular division is North Atlanta. Preferably, the online version of the manager report 700 allows the manager to retrieve and view a report that appears on the list of reports 712 by selecting that report. For example, if the manager wanted to view the weekly statistics for the week ending Jan. 31, 1998, the manager could select the report 714 that corresponds to that time period and the system would retrieve that report, the weekly division reports 800 (shown in FIGS. 8 and 9) and allow the manager to view, send and manipulate weekly division reports 800.

The manager report can also preferably include provisions that allow the manager to easily retrieve reports related to sub-divisions within the larger division under the responsibility of the manager. Preferably, these sub-divisions are service centers located within the larger division. In the embodiment shown in FIG. 7, the manager report 700 is for the North Atlanta division and the sub-divisions 716 are service centers located at 14th Street, Fairburn, Stockbridge, and Tucker. In a manner similar to the list of other reports 712, the manager report 700 preferably allows the manager to select one or more of the sub-divisions and retrieve information for that sub-division.

Other sections of the manager report 700, including an options portion 718 allow the manager to select various options. Some of the possible options include the ability to locate a vehicle 720, to retrieve technician attributes 722 and vehicle attributes 724. The system can also provide drop down menus to assist in the selection of a vehicle or a technician. The manager report 700 can also preferably include provisions that allow managers to perform other functions. These other functions can include the ability to generate daily route histories 726, generate productivity parameters 728, manage reporting parameters 730, and manage group assignments 732.

FIGS. 8 and 9 show an example of a preferred weekly division report 800. The preferred weekly division report can include a title 802, a date range 804, a division 806, and a manager's name 808. Preferably, the weekly division report 800 is organized by service center or by supervisor. In some cases, there is only one supervisor per service center, but the system provides flexibility to accommodate other situations.

The first section 810 of division report 800 relates to a particular service center and a particular supervisor and provides information about that service center. Some of the information in the first section 810 include a date, an average time out of the gate (the time the system detects the vehicle left the service center), an average back to barn (the time the system detects the vehicle returned to the service center), average work time (the total time between out of gate and back to barn minus windshield time), average windshield time (the time the system detects the vehicle to be driven or in motion), average engine run time, average engine starts, average revisits (the number of times the vehicle revisited the service center), and average mileage. Because the information contained in the first section 810 are averages, the figures represent the average of all of the technicians under the authority of the supervisor for that particular day. The bottom of the first section 810 can include a weekly average.

The weekly division report 800 can also include other sections that give details of other service centers. In the embodiment shown in the FIGS. 8 and 9, three other sections, a second section 820 that relates to the service center at Fairburn, a third section 830 that relates with Stockbridge and a fourth section 840 regarding Tucker are also included in the weekly division report 800. Preferably, the other sections 820, 830, and 840, include substantially similar information to that contained in the first region 810.

FIG. 10 shows an example of a preferred supervisor report 1000. The supervisor report 1000 preferably includes similar bibliographic information as the manager report 700 (see FIG. 7) disclosed above. The supervisor report 1000 includes a system name 1002, in this example, the system name is "BellSouth GPS System." The supervisor report 1000 can also include a reference name 1004 of the report. In this example, the reference name 1004 of the report is "Supervisor Page." The supervisor report 1000 can also preferably include the name 1006 of the supervisor, the service center 1008 where the supervisor has been assigned, and a date 1010.

Supervisor report 1000 can also include a list of other reports 1012 that may be of interest to the supervisor. In the preferred example shown in FIG. 10, the list of other reports 1012 includes weekly and monthly statistics for different periods of time, for the particular service center overseen by that supervisor. The list of other reports 1012 also includes reports related to each individual technician that works under the supervisor. The report can be organized by a list of daily reports for individual technicians followed by weekly statistics for the service center, and finally concluding with monthly statistics for the service center.

Preferably, the online version of the supervisor report 1000 allows the supervisor to retrieve and view a report that appears on the list of reports 1012 by selecting that report. For example, if the supervisor wants to view the weekly statistics for the week ending Jan. 31, 1998, the supervisor could select the report 1014 that corresponds to that time period and the system would retrieve that report, the weekly statistical report 1100 (shown in FIGS. 11 and 12), and allow the supervisor to view, send, and manipulate the weekly statistical report 1100.

The online version of the supervisor report 1000 preferably includes an options portion 1020 that allows the supervisor to review other types of information and request the system to perform other tasks. Some of the possible options include the ability to locate a vehicle 1022, to retrieve technician attributes 1024 and vehicle attributes 1026. The system can also provide drop down menus to assist in the selection of a vehicle or a technician. The supervisor report 1000 can also preferably include provisions that allow supervisors to perform other functions. These other functions can include the ability to generate daily route histories 1028 and generate productivity parameters 1030.

FIGS. 11 and 12 show an example of a weekly statistical report 1100. The preferred weekly statistical report 100 can include a title 1102, a date range 1104, a sub-division or service center 1106, and a supervisor's name 1108. Preferably, the weekly statistical report 1100 includes information regarding the technicians that are supervised by the supervisor.

The first section 1110 of the weekly statistical report relates to a particular technician and the technician's vehicle. While the weekly statistical report 1100 can include a variety of information, the weekly statistical report 1100 preferably includes a group affiliation for the technician, a vehicle identifier, a technician identifier, a date, an out of the gate time (the time the system detects the vehicle left the service center), a back to barn time (the time the system detects the vehicle returned to the service center), work time (the total time between out of gate and back to barn minus windshield time), windshield time (the time the system detects the vehicle to be in motion), engine run time, engine starts, revisits (the number of times the vehicle revisited the service center), and mileage. The bottom of the first portion 1110 can include a weekly average for the technician.

Similarly, the second section 1120 and the third section 1130 of the weekly statistical report can include similar information for other technicians. While preferred embodiment shows the weekly statistics for three technicians, the system could be used for any number of technicians. A lower section 1140 of the weekly report can include group averages and division averages.

The information contained in this first section 1110 of the weekly statistics report 1100 related to technician ST109 can be combined with information related to other technicians, for example, technician ST143 (shown in the second section 1120), and technician ST152 (shown in the third section 1130). The information for a predetermined group of technicians can be combined to arrive at group averages. These group averages can be stored and can be made available to authorized users. In addition, the information for all of the technicians in a service center or sub-division can be combined to arrive at averages for entire service centers. "his averaged information can be stored and made available for authorized users. One example of information related to service center averages is shown in FIGS. 8 and 9.

FIG. 13 shows an example of a preferred daily route history report 1300. Like other reports, the daily route history report 1300 can include bibliographic information, including a title 1302, a technician identifier 1304, a vehicle identifier 1306, a date 1308, a name of the technician 1310, a group affiliation for the technician 1312, and the name of the service center 1314 associated with the technician. The daily route history 1300 is a detailed report that gives details about the activities of a particular technician. Preferably, the daily route history 1300 uses information collected from the technician's I.C.U. 100 (see FIG. 1) to reconstruct the activities of the technician and other attributes of the technician or the technician's vehicle throughout a given day. Preferably, this information is in the form of a table 1320.

The table 1320 preferably includes the following information: an item number, a time, a street address, a county and state, minutes, speed, and type of point. The system records information at predetermined periods of time and also records information when noteworthy events occur throughout the day. The table 1320 captures nearly all of the information regarding the technician's location for any given day. A lower section 1330 preferably includes additional information. Preferably, the lower portion 1330 includes the time out of gate, the back to barn time, windshield time, engine run time, mileage, and the number of starts.

In addition to the daily route history 1300 shown in FIG. 13, the preferred embodiment of the present invention includes several options and features that are available with the daily route history. One option is the ability of a user to obtain a single or multi-day daily route history for an individual vehicle or a group of vehicles. Reports can contain multiple days of daily route histories. The system is flexible in accommodating any multiple day request. However, reports that range from a single day to the past 31 days are preferred. Daily route histories for different days are displayed on separate maps or they can be displayed on a single map with an option to display up to five consecutive or non-consecutive days, with different icon shapes and colors to represent different days.

The system includes an option that allows supervisory and management users to automatically receive a daily route history 1300 for the previous day for each technician and vehicle in their organization. Authorized supervisors and managers have the ability to specify the method of how the daily route history 1300 is delivered to themselves or any other user.

Delivery options for the daily route histories 1300 includes: (1) SMTP compliant e-mail delivery to a specified address, with an Intranet-link utility attached to an e-mail message to move the user to the Intranet address for the report; (2) print file sent to a specified printer; (3) HTML formatted report file written to a specified directory, viewable using HTML version 1.0 or later; (4) HTML format file accessible on an Intranet system accessible by the user; or (5) no delivery. In addition to the daily route histories 1300 being delivered, the system maintains, on-line, past daily route history information and at least retains the most recent daily route history 1300 for each individual vehicle or technician.

FIGS. 14A and 14B show an example of a route history report 1400. A route history report 1400 is a summary of a vehicle's activities for a given time period. The time period can be set as any desired period, examples of the time periods include one day or one shift. The route history report 1400 can be displayed or printed either in tabular or graphical format. The invention includes provisions that allow users to switch between a tabular format and a graphical map-type format. The route history report 1400 provides the data, preferably in the form of item number, vehicle name, date, time, type, minutes (or the elapsed time spent at a particular location), speed, address, country (or any other political sub-division) state and ZIP code, for the graphical route history shown in FIG. 15.

Figure 15:
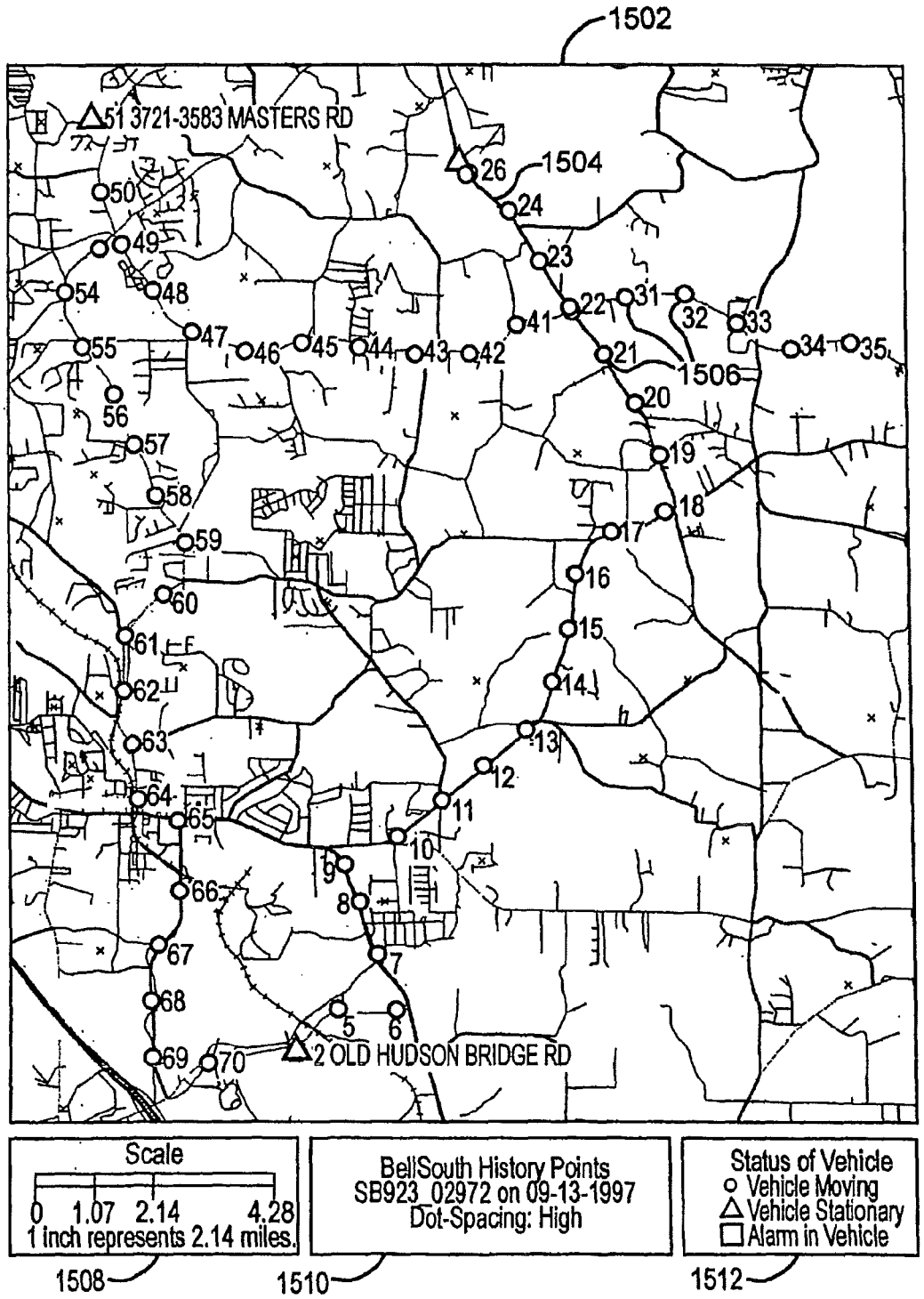
FIG. 15 is an example of a graphical route history, according to the present invention.

FIG. 15 shows an example of a graphical route history 1500 according to the present invention. Graphical route history 1500 is preferably in the form of a map 1502 that shows the route 1504 traveled by the vehicle. Graphical route history 1500 can also include time and G.P.S. position information. In the example shown in FIG. 15, the time and G.P.S. position information is shown symbolically with map icons 1506. Preferably, this information is overlaid or superimposed on a map so the location of the vehicle or technician can be observed with reference to geographical features. Graphical route history 1500 preferably includes a scale 1508, a title 1510, and a key or legend 1512. Graphical route history 1500 is scalable and users can define or select various sizes of maps. The system can also automatically adjust the map so that all data points are included and the map is produced at the highest possible resolution. Preferably, different icon shapes and colors shall be used to indicate different points or vehicle attributes such as stopped vs. moving, alerts, and exceptions.

Exception reports are reports that contain information related to exceptions that have been logged by the system. Recall that exceptions are situations where some attribute, characteristic, or data falls outside a predetermined parameter. The system allows authorized users to create reports that just list exceptions. These reports are called exception reports. The exception reports can include one or multiple technicians and the exception reports can be created for any desired parameter.

An example of an exception report 1600 is shown in FIG. 16. This exception report was created to list or collect all instances where the speed of a vehicle exceeded sixty nine miles per hour. Thus, in generating this report, the speed parameter was set at sixty nine miles per hour, and any instances where the speed of a vehicle exceeded sixty nine miles per hour (a value outside the boundaries of the parameter, and therefore considered an exception) the system collected that instance and included it in the exception report 1600. The exception report 1600 can include any relevant information. In the example shown in FIG. 16, the vehicle name, the date, the time, the speed and the name of the driver are included in the exception report. These items are generally relevant to the excessive speed exception and are therefore included. Similarly, other exception reports would contain information relevant to the exception being analyzed.

Exception reports can preferably be generated automatically, and delivered to the supervisor or manager. The method and time of exception report delivery can be configured to suit the preferences of the recipient. Delivery options for the exception reports includes: (1) SMTP compliant e-mail delivery to a specified address, with or without an Intranet-link, (2) utility attached to an e-mail message to move the user to the Intranet address for the report, (3) HTML format file accessible on an Intranet system; (4) print file sent to a specified printer; (5) "print to file" capability; or (6) no delivery.

In terms of formatting, exceptions for all vehicles in a supervisor's organization for a single day are preferably contained on the same exception report. Both graphical and tabular formats of the daily route history for each vehicle with an exception is available. Preferably, these exception reports are accessed using an Intranet-link utility attached to an e-mail message to move the user to the Intranet address for the report.

Figure 17:
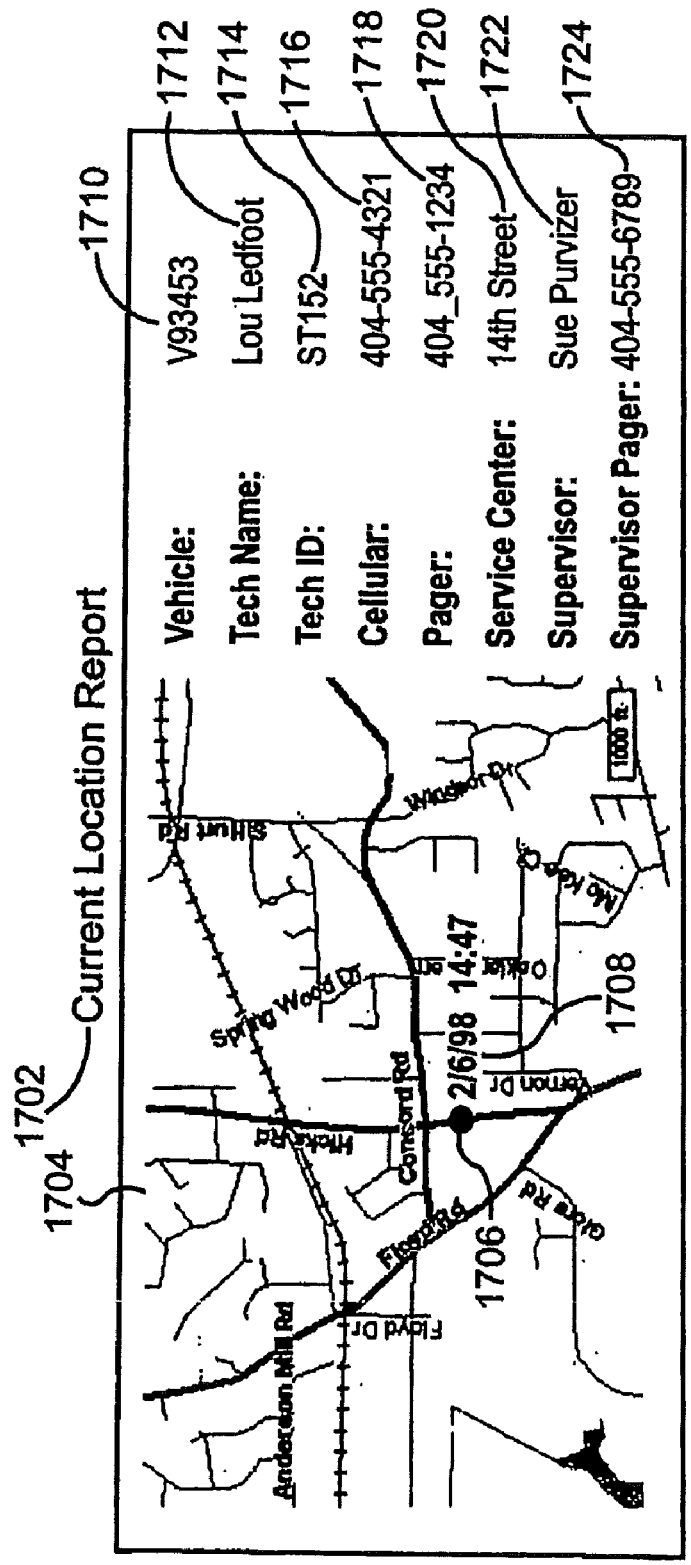
FIG. 17 is an example of a current location report, according to the present invention.

FIG. 17 shows a current location report 1700. This report allows the user to quickly determine the location of a vehicle or a technician. Like other reports, this report can be viewed on line or printed. The current location report 1700 can display a real time location of the vehicle or technician or can display a near real time location of the vehicle or technician. Real time displays provide more accurate location information but require sufficient computer resources to handle the large amount of information. On the other hand, near real time displays, displays that are delayed because position information is only transmitted at predetermined intervals of time, for example, one to ten minutes, are less accurate but also require less computer resources. Given these considerations, the system can be designed to optimize this trade-off between location accuracy and the need and expense of computer resources. A two minute location transmission interval is preferred. In other words, vehicles transmit their locations every two minutes to the central office. This also means that the preferred current location report 1700 displays the location of the vehicle two minutes ago.

Referring to FIG. 17, the current location report 1700 can include any desired information. Preferably the current location report 1700 includes a title 1702, a map portion 1704, an icon 1706 representing the current location of the vehicle in question, a date and time stamp 1708, a vehicle identifier 1710, a technician's name 1712, a technician identifier 1714, the cellular telephone number 1716 of the vehicle, the pager number 1718 of the technician, the service center 1720 where the vehicle originated, the technician's supervisor 1722, and the supervisor's pager number 1724.

Figure 18:
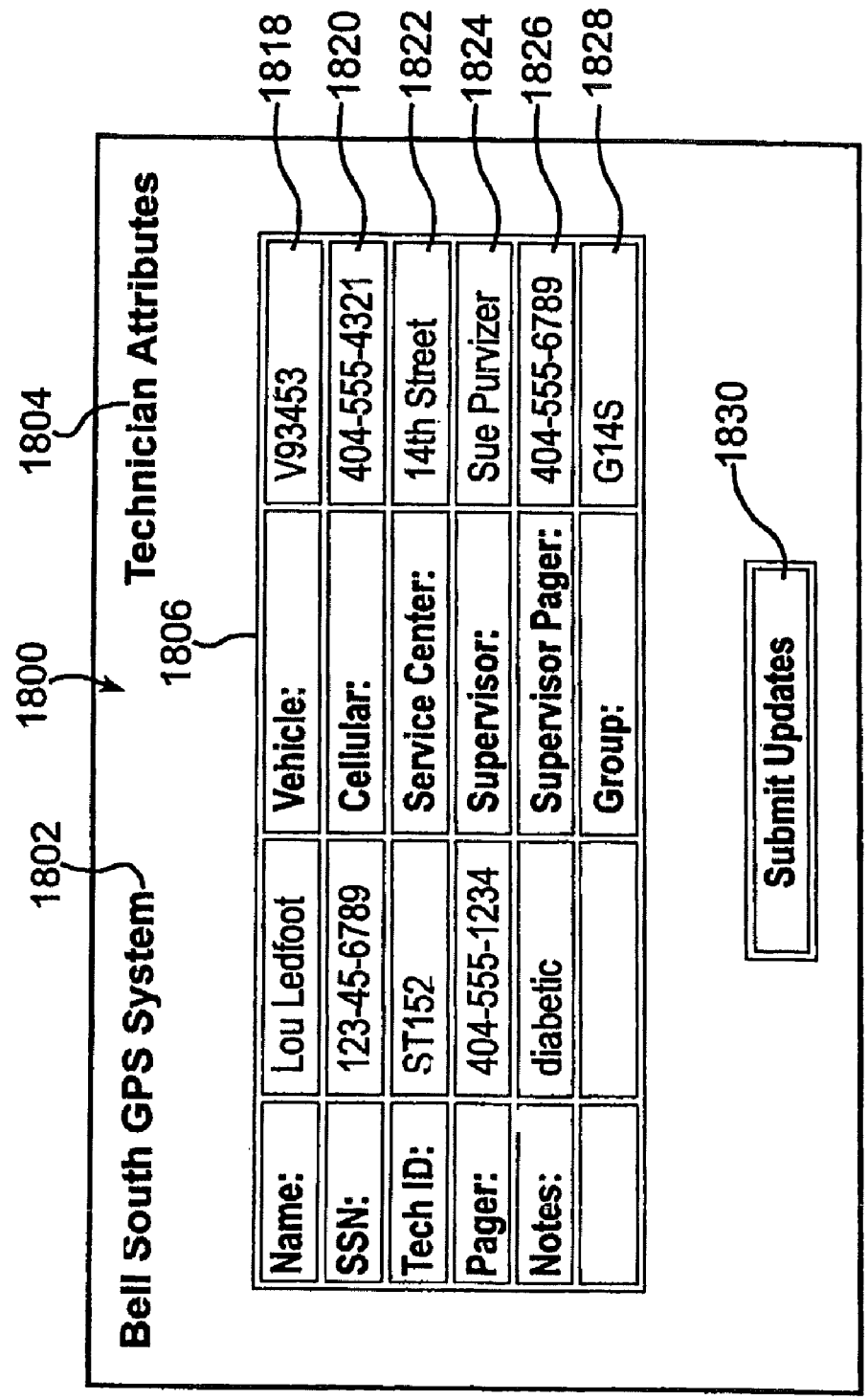
FIG. 18 is an example of a preferred technician attributes report, according to the present invention.

Administrative reports contain information associated with individual technicians or vehicles. One example of an administrative report, as shown in FIG. 18, is a technician attributes report 1800. This report can be viewed on line or printed like other reports. The technician attributes report 1800 includes information regarding a technician. The technician attributes report 1800 can be designed to suit particular needs. However, the preferred technician attributes report 1800 includes a system title 1802, a title 1804 of the report, and a table 1806. The table 1806 includes a technician's name 1808, the technician's social security number 1810, a technician identifier 1812, the technician's pager number 1814, notes 1816 (in this case, the technician attributes report 1800 notes that the technician is diabetic), the vehicle number 1818 assigned to the technician, the cellular telephone number 1820 of the vehicle, the service center 1822 where the vehicle originated, the technician's supervisor 1824, the supervisor's pager number 1826, and the technician's group 1828.

The technician attributes report 1800 allows authorized users to enter corrections and easily submit updates directly onto the report the technician attributes report 1800 includes a submit updates button 1830 that saves the updates made by the authorized user.

Any of the various disclosed components can be used alone, with other known components, or with features or components of the present invention.

It will be apparent to those skilled in the art that various modifications and variations can be made in the GPS Management System of the present invention without departing from the spirit or scope of the invention.

The foregoing disclosure of embodiments of the present invention has been presented for purposes of illustration and description. It is not exhaustive or intended to limit the invention to the precise forms disclosed herein. Many variations and modifications of the embodiments described herein will be obvious to one of ordinary skill in the art in light of the above disclosure. The scope of the invention is to be defined only by the claims appended hereto, and by their equivalents.

The invention claimed is:

1. A multi-mode in-vehicle control apparatus to be placed in a vehicle, the apparatus comprising:
a communication device configured to transmit vehicle data over a transmission network using a transmission protocol, the vehicle data corresponding to an operating parameter of the vehicle; and
a processor operatively coupled to the communication device, the processor being configured to make the control apparatus operable to:
monitor an operating parameter of the vehicle;
compare the operating parameter to a predefined parameter threshold for the operating parameter;
recognize an operating parameter exception, the operating parameter exception comprising a violation of the predefined parameter threshold for the operating parameter; and
upon recognizing the operating parameter exception, transmit the vehicle data corresponding to the operating parameter of the vehicle using the communication device and the transmission protocol;
wherein the operating parameter exception comprises the violation of the predefined threshold relating to a particular operating parameter selected from a group of particular operating parameters consisting of:
a shift parameter, the predefined threshold for the shift parameter comprising a time of departure from a service center;

a stationary time parameter, the predefined threshold for the stationary time parameter comprising a maximum amount of time the vehicle is allowed to be stationary;

a windshield parameter, the predefined threshold for the windshield parameter comprising an amount of driving time, the amount of driving time comprising a minimum amount of time and a maximum amount of time;

an ignition on parameter, the predefined threshold for the ignition on parameter comprising an amount of time an ignition device of the vehicle is activated;

a revisit parameter, the predefined threshold for the revisit parameter comprising an amount of times the vehicle is allowed to visit a service center; and a mileage parameter, the predefined threshold for the mileage parameter comprising a distance traveled by the vehicle.

2. The control apparatus of claim 1, wherein the vehicle data comprises location information, the location information comprising data indicating a location of the vehicle.

3. The control apparatus of claim 1, wherein the vehicle data comprises an alert call, the alert call indicating an emergency condition at the vehicle.

4. A control unit for a vehicle, the control unit comprising:
a communication device operatively coupled to a transmission network using a transmission protocol;
wherein the control unit is configured to:
monitor an operating parameter of the vehicle;
compare the operating parameter to a predefined parameter threshold for the operating parameter;
recognize an operating parameter exception, the operating parameter exception comprising a violation of the predefined parameter threshold; and
upon recognizing the operating parameter exception:
transmit, via the communication device, the vehicle data corresponding to the operating parameter of the vehicle; and
wherein the operating parameter exception comprises the violation of the predefined threshold relating to a particular operating parameter selected from a group of particular operating parameters consisting of:

a shift parameter, the predefined threshold for the shift parameter comprising a time of departure from a service center;

a stationary time parameter, the predefined threshold for the stationary time parameter comprising a maximum amount of time the vehicle is allowed to be stationary;

a windshield parameter, the predefined threshold for the windshield parameter comprising an amount of driving time, the amount of driving time comprising a minimum amount of time and a maximum amount of time;

an ignition on parameter, the predefined threshold for the ignition on parameter comprising an amount of time an ignition device of the vehicle is activated;

a revisit parameter, the predefined threshold for the revisit parameter comprising an amount of times the vehicle is allowed to visit a service center; and a mileage parameter, the predefined threshold for the mileage parameter comprising a distance traveled by the vehicle.

5. The control unit of claim 4, wherein:
the communication device comprises a cellular modem in communication with a cellular telephone network using a cellular transmission protocol.

6. The control unit of claim 4, wherein:
the communication device comprises a wireless data modem in communication with a wireless data network using a wireless data transmission protocol.

7. The control unit of claim 4, wherein:
the communication device comprises a transmitter in communication with a satellite network using the transmission protocol.

8. The control unit of claim 4, wherein the control unit is further configured to transmit, to a central office, the vehicle data.

9. The control unit of claim 4, wherein the vehicle data comprises location information, the location information comprising data indicating the location of the vehicle.

10. The control unit of claim 4, wherein the vehicle data comprises an alert call, the alert call indicating an emergency condition at the vehicle.

* * * * *